US008814655B2

(12) United States Patent
Kitamura et al.

(10) Patent No.: US 8,814,655 B2
(45) Date of Patent: Aug. 26, 2014

(54) GAMING MACHINE AND CONTROL METHOD THEREOF

(75) Inventors: Kenta Kitamura, Tokyo (JP); Yoichi Kato, Tokyo (JP); Makoto Miyawaki, Tokyo (JP); Hiromoto Yamauchi, Tokyo (JP)

(73) Assignees: Universal Entertainment Corporation, Tokyo (JP); Aruze Gaming America, Inc., Las Vegas, NV (US)

( * ) Notice: Subject to any disclaimer, the term of this patent is extended or adjusted under 35 U.S.C. 154(b) by 206 days.

(21) Appl. No.: 13/068,860

(22) Filed: Jun. 2, 2011

(65) Prior Publication Data

US 2012/0309486 A1 Dec. 6, 2012

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |

(52) U.S. Cl.
USPC .................................. 463/20; 463/21; 463/31

(58) Field of Classification Search
CPC ..... A63F 13/12; A63F 13/06; G07F 17/3244; G07F 17/3286; G07F 17/34
USPC ........................................................... 463/20
See application file for complete search history.

(56) References Cited

U.S. PATENT DOCUMENTS

| | | | | |
|---|---|---|---|---|
| 2003/0224851 | A1 * | 12/2003 | Gilmore | 463/20 |
| 2005/0003886 | A1 * | 1/2005 | Englman et al. | 463/25 |
| 2005/0054422 | A1 * | 3/2005 | Rothkranz et al. | 463/20 |
| 2005/0124410 | A1 * | 6/2005 | Vlazny et al. | 463/28 |
| 2010/0120536 | A1 * | 5/2010 | Chatellier et al. | 463/40 |

OTHER PUBLICATIONS

"Mario Party," Feb. 8, 1999, Nintendo, YouTube video link http://www.youtube.com/watch?v=sFAXo-WN8qk.*

* cited by examiner

*Primary Examiner* — Kevin Y Kim
(74) *Attorney, Agent, or Firm* — Lexyoume IP Meister, PLLC

(57) ABSTRACT

A gaming machine 10 has: a display device 12 configured to display a plurality of symbols to be continuously arranged; and a controller 30. The controller 30 executes the processing operations of: (a1) executing game processing and then according to a result of the game processing, determining whether or not to scroll at least one array of the symbols; (a2) scrolling the symbol array according to a result of the determination; and (a3) carrying out processing according to a result of the scroll.

6 Claims, 20 Drawing Sheets

GAMING MACHINE AND CONTROL METHOD THEREOF

BACKGROUND OF THE INVENTION

1. Field of the Invention

The present invention relates to a gaming machine and a control method of the gaming machine that executes a scramble game between game terminals.

2. Description of the Related Art

Conventionally, in gaming machines, it has been general that a win or loss in a game is determined between a gaming facility side (a gaming machine side), on which the gaming machines have been installed, and players, and a prize is awarded to a winning player according to the win or loss. Such gaming machines are disclosed in United State Patent Application Publication No. 2008/0058067 and United State Patent Application Publication No. 2008/0058072.

In the meantime, it is considered that a gaming machine with its higher interest can be provided if there can be imparted a new gaming property of scrambling prizes between players, in addition to the presence or absence of prizes between gaming machines (a gaming facility) and players.

Therefore, it is an object of the present invention to provide a gaming machine that is capable of imparting a new gaming property of scrambling prizes between players.

SUMMARY OF THE INVENTION

A gaming machine according to embodiment of the present invention comprising:

a display device configured to display a plurality of symbols to be continuously arranged; and a controller programmed to execute the processing operations of:

(a1) executing game processing and then determining whether or not to scroll at least one array of the symbols according to a result of the game processing;

(a2) scrolling the symbol array according to a result of the determination; and (a3) carrying out processing according to a result of the scroll.

According to the configuration described above, a player can be given an enjoyment that a screen changes in accordance with the progress of a game by means of screen display of symbol array scrolling.

The gaming machine according to embodiment of the present invention, in the above the configuration further comprising:

a first display device; and a second display device that is disposed upward of the first display device, wherein the controller is configured to:

movably display an image of a die that is displayed on the first display device, so as the image of the die moves to the second display device and then determine a number that is assigned to any one face of the die as a result of the game processing in the processing operation (a1); and scroll the at least one array of the symbols that is displayed on the second display device, according to the determined number of the die in the processing operation (a2).

According to the configuration described above, a player's interest in a game can be enhanced by means of rendering of dice image rolling.

The gaming machine according to embodiment of the present invention, in the above the configuration further comprising:

the controller is configured to execute a game to be played in a manner so as to scramble a participation cost that is paid from a respective one of a plurality of game terminals that are provided to be adjacent to each other, among the plurality of game terminals, in the processing operation (a3).

According to the configuration described above, there can be provided a gaming machine with its further enjoyment, the gaming machine employing a match play element, in comparison with a case of playing a game by a player solely, by executing a game configured to scramble participation costs of the players.

A control method of a gaming machine according to embodiment of the present invention, the gaming machine has a display device configured to display a plurality of symbols to be continuously arranged, the control method comprising the steps of:

(a1) executing game processing and then determining whether or not to scroll at least one array of the symbols according to a result of the game processing;

(a2) scrolling the symbol array according to a result of the determination; and (a3) carrying out processing according to a result of the scroll.

According to the control method described above, a player can be given an enjoyment that a screen changes in accordance with the progress of a game by means of screen display of symbol array scrolling.

DESCRIPTION OF THE PREFERRED EMBODIMENTS (Outline of Gaming Machine)

Figure 1:
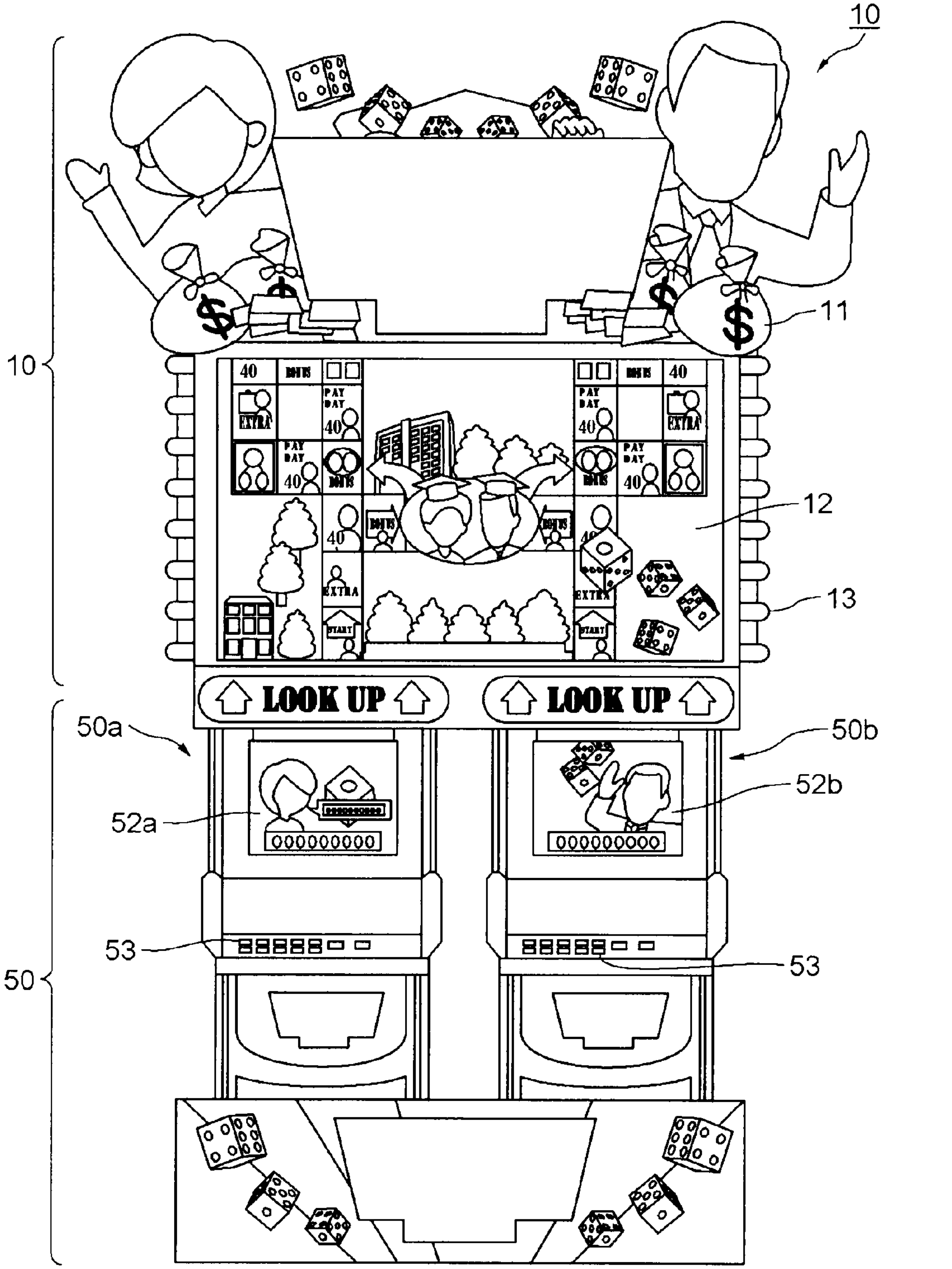
FIG. 1 is a view showing an appearance of a gaming machine.

Hereinafter, an illustrative embodiment of the present invention will be described with reference to the drawings. As shown in FIG. 1, a gaming machine 10 according to the illustrative embodiment has two game terminals 50*a* and 50*b* that are adjacent to each other and one common display device 12. In a gaming machine 1, if a scramble event occurs while a normal game is executed, players adjacent to each other can participate in the scramble event by paying a participation cost. The participation cost can be paid by entering credits in the gaming terminals 50*a* and 50*b*. A player having won the scramble event can receive the participation costs paid by the two players.

The scramble event is an event that occurs randomly, and is also an event that occurs in a case where a predetermined trigger condition is established on at least one side of the adjacent players.

The normal game is a game to be played by advancing the number of frames according to the number obtained by rolling dice, and the common display device 12 displays a travelling route that is formed by a plurality of frames, each of which is employed for the game terminals 50*a* and 50*b*. In this normal game, in the game terminals 50*a* and 50*b*, the respective terminal display devices 52*a* and 52*b* display dice images, and then, a player makes a predetermined operation, whereby a dice image rolls and then one's own pieces that are displayed on the common display device 12 is or are advanced by the number of frames corresponding to the rolled number.

Figure 2:
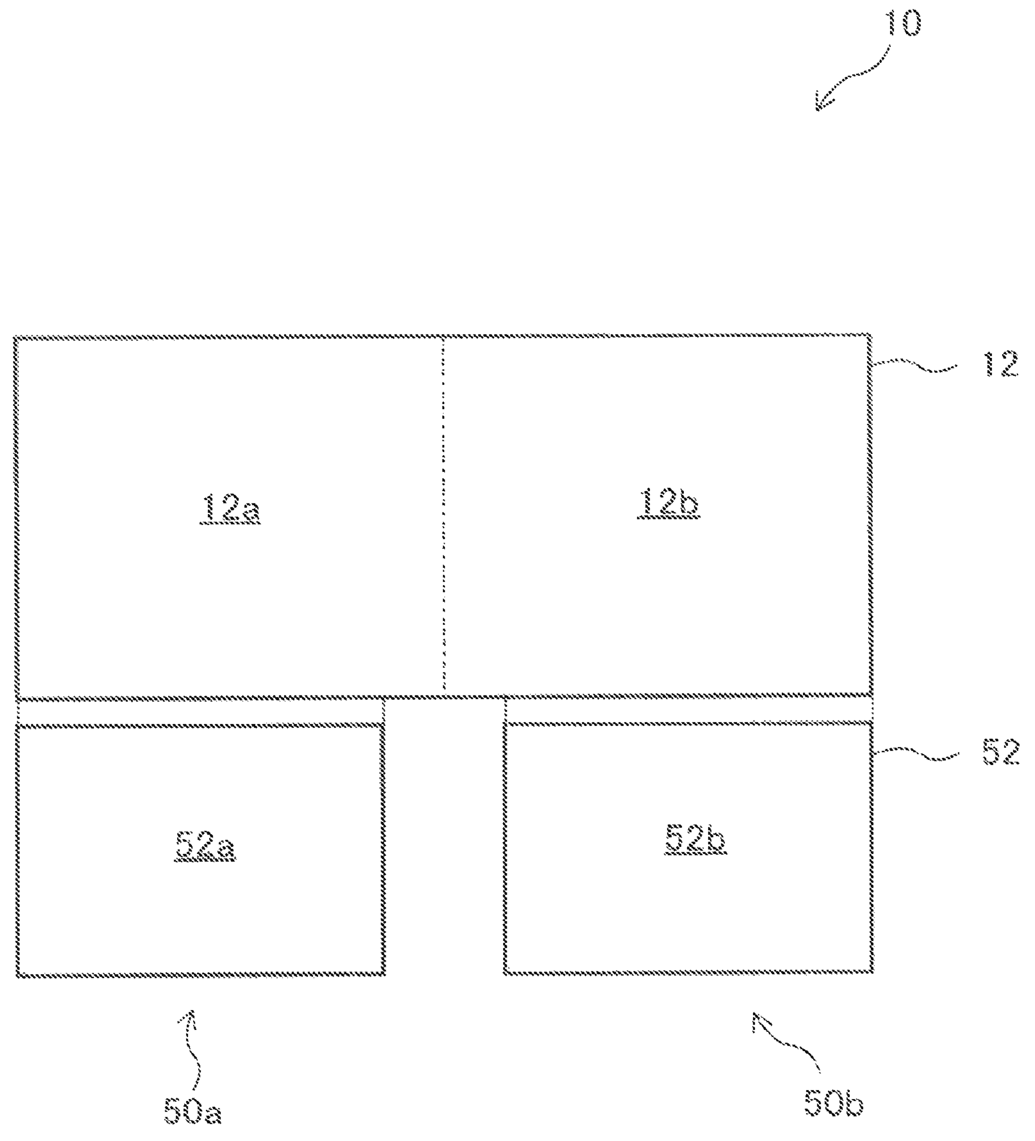
FIG. 2 is a view showing a layout example of a display device in the gaming machine.

FIG. 2 is a schematic wiring diagram showing a layout of the common display device 12, the game terminals 50*a* and 50*b*, and terminal display devices 52*a* and 52*b*. The terminal display devices 52*a* and 52*b* of the game terminals 50*a* and 50*b* are disposed adjacent to each other, and the common display device 12 is disposed at an upper part of these display devices. On the common display device 12, a first display region 12*a* and a second display region 12*b* are provided according to positions of the terminal display devices 52*a* and 52*b* of the respective game terminals 50*a* and 50*b*. A travelling route corresponding to the game terminal 50*a* is displayed in the first display region 12*a*, and a travelling route corresponding to the game terminal 50*b* is displayed in the second display region 12*b*. The piece corresponding to the game terminal 50*a* is configured to advance the travelling route that is displayed in the first display region 12*a*, in accordance with the progress of a game in the game terminal 50*a*. In addition, the piece corresponding to the game terminal 50*b* is configured to advance the travelling route that is displayed in the second display region 12*b*, in accordance with the progress of a game in the game terminal 50*b*.

Figure 3:
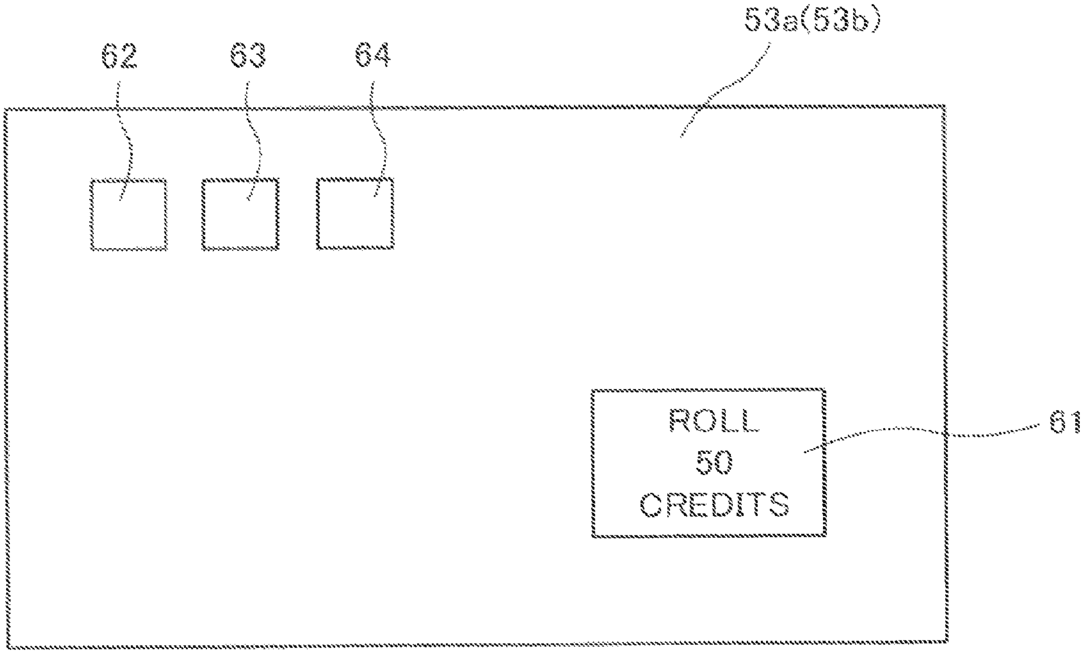
FIG. 3 is a view showing an operating portion in the gaming machine.

FIG. 3 is a schematic wiring diagram showing operating portions 53*a* and 53*b* that are respectively provided in the game terminals 50*a* and 50*b*. The game terminals 50*a* and 50*b* respectively have the operating portions 53*a* and 53*b* that have their similar configurations.

A change button (a CHANGE button) 64, a cashout button (a CASHOUT button) 53, and a help button (a HELP button) 62 are provided in the operating portions 53*a* and 53*b*, and a "ROLL 50 CREDITS" button (a ROLL button) 61 is provided. A player operates the "ROLL 50 CREDITS" button 61 to thereby enter a predetermined number of credits (for example, 50 credits) from the player's credits, and then, a normal game can be advanced.

Figure 4:
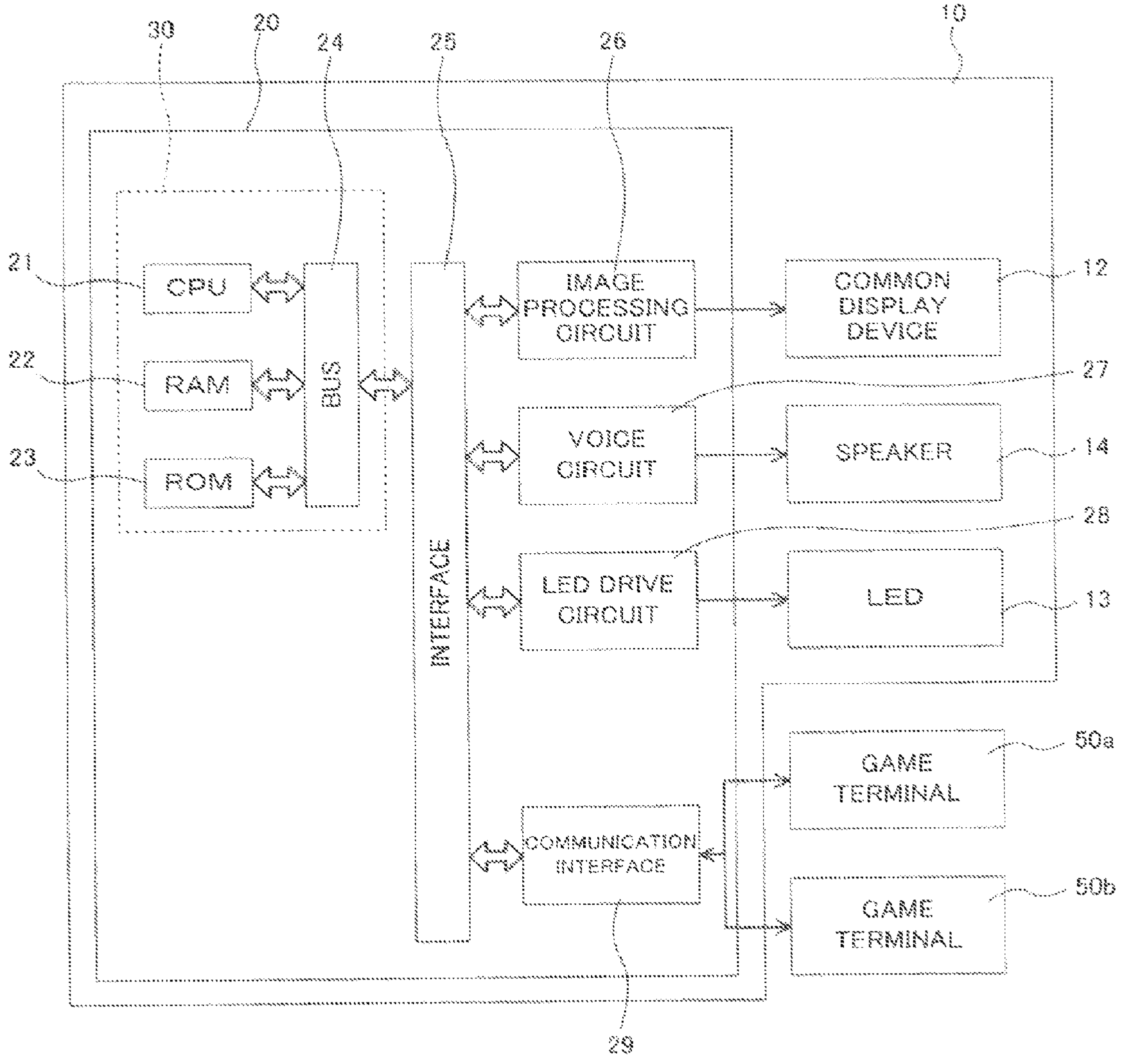
FIG. 4 is a view showing an internal configuration of the gaming machine.

FIG. 4 is a block diagram depicting a configuration of the gaming machine 10. As shown in FIG. 4, the gaming machine 10 includes: a control portion 30 having a CPU 21, a RAM 22, and a ROM 23, and a bus 24 for connecting them; an image processing circuit 26 for image-processing a signal that is output from the control portion 30 via an interface 25; a common display device 12 for displaying an image by means of the signal image-processed in the image processing circuit 26; a voice circuit 27 for converting the signal that is output from the control portion 30 via the interface 25 to a voice signal; a speaker 14 for outputting a voice by means of the voice signal that is output from the voice circuit 27; an LED drive circuit 28 for generating a signal for driving an LED 13, based on the signal that is output from the control portion 30 via the interface 25; the LED 13 for emitting light by means of a LED drive signal that is output from the LED drive circuit 28; and a communication interface 29 for outputting the signal that is output from the control portion 30 via the interface 25, to the game terminals 50*a* and 50*b*.

A control device 20 is comprised of: the control portion 30; the interface 25; the image processing circuit 26; the voice circuit 27; the LED drive circuit 28, and the communication interface 29.

Figure 5:
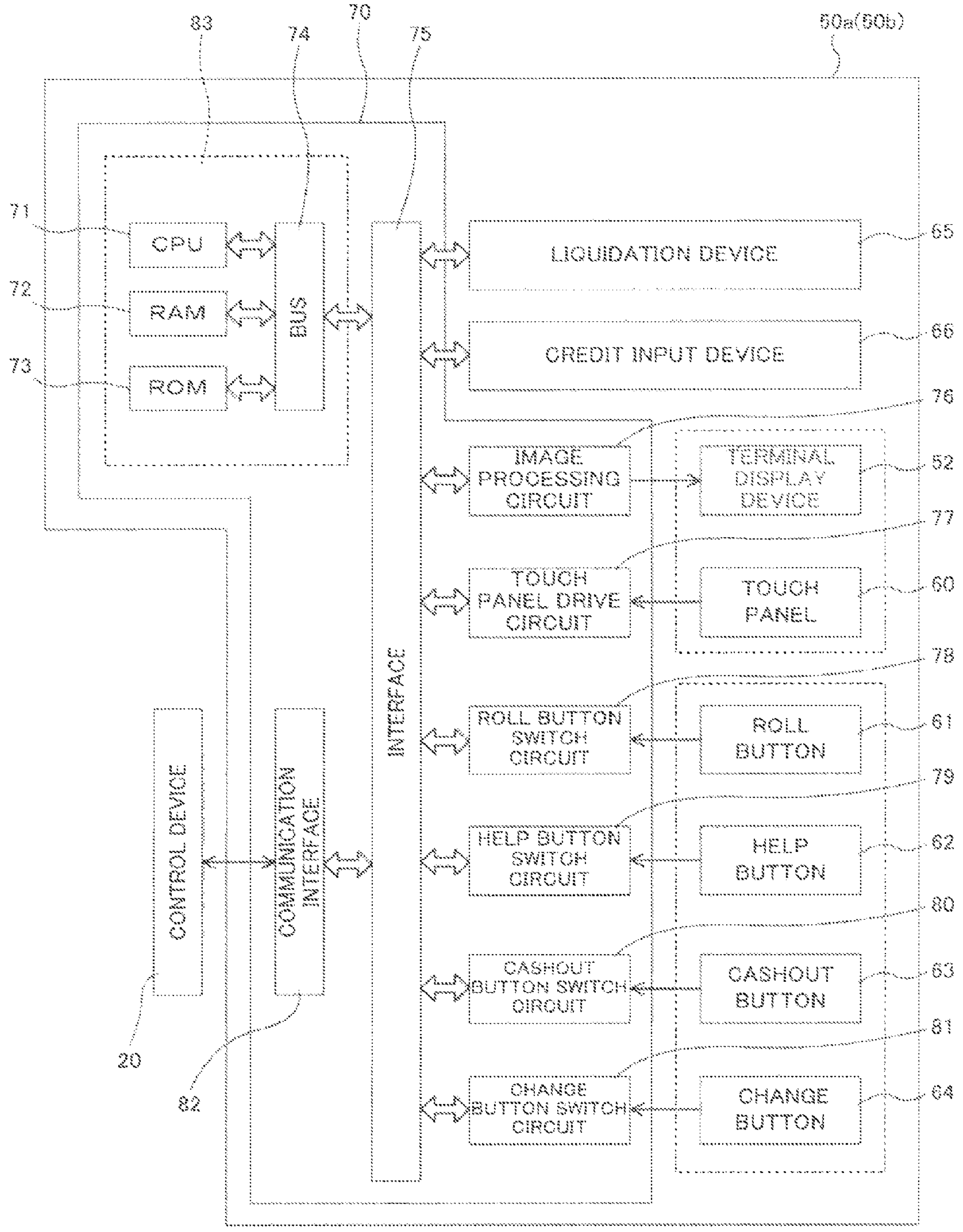
FIG. 5 is a view showing an internal configuration of a game terminal.

FIG. 5 is a block diagram depicting a configuration of the game terminals 50*a* and 50*b*. While only the game terminal 50*a* will be described herein, it is assumed that the game terminal 50*b* also has a similar configuration. As shown in FIG. 4, the game terminal 50*a* includes: a control portion 83 having a CPU 71, a RAM 72, a ROM 73, and a bus 74 for connecting them; a liquidation device 65 for carrying out liquidation processing, based on a signal that is output from the control portion 83 via an interface 75; a credit input device 66 for carrying out input processing of a credit, based on the signal that is output from the control portion 83 via the interface 75; an image processing circuit 76 for image-processing the signal that is output from the control portion 83 via the interface 75; a terminal display device 52 for displaying an image by means of the signal that is image-processed in the image processing circuit 76; a touch panel 60 for accepting a pressing operation from a player; a touch panel drive circuit 77 for driving the touch panel 60 and outputting an operation result that is output from the touch panel 60 to the control portion 83 via the interface 75; a ROLL button 61 for displaying dice images on the terminal display device 52 and the common display device 12 (FIG. 4) and inputting a command for changing images of the dice so as to roll; a ROLL button switch circuit 78 for receiving an operation result of the ROLL button 66 and then outputting the received operation result to the control portion 83 via the interface 75; a HELP button 62 for accepting an input operation from a player and then instructing the control portion 83 to carry out a predetermined emergency operation; a HELP button switch circuit 79 for receiving an operation result of the HELP button 62 and then outputting the received operation result to the control portion 83 via the interface 75; a CASHOUT button 63 for accepting an input operation from a player and then instructing the control portion 83 to carry out cashout processing; a CASHOUT button switch circuit 80 for receiving an operation result of the CASHOUT button 63 and then outputting the received operation result to the control portion 83 via the interface 75; a CHANGE button 64 for accepting an input operation from a player and then instructing the control portion 83 to carry out change processing; and a CHANGE button switch circuit 81 for receiving an operation result from the CHANGE button 64 and then outputting the received operation result to the control portion 83 via the interface 75.

A control device 70 is comprised of: the control portion 83; the interface 75;

the image processing circuit 76; the touch panel drive circuit 77; the ROLL button switch circuit 78; the HELP button switch circuit 79; the CASHOUT button switch circuit 80; the CHANGE button switch circuit 81; and a communication interface 82.

The communication interface 82 is intended to make communication with the control device 20 (the communication interface 29) of the gaming machine 10.

Figure 6:
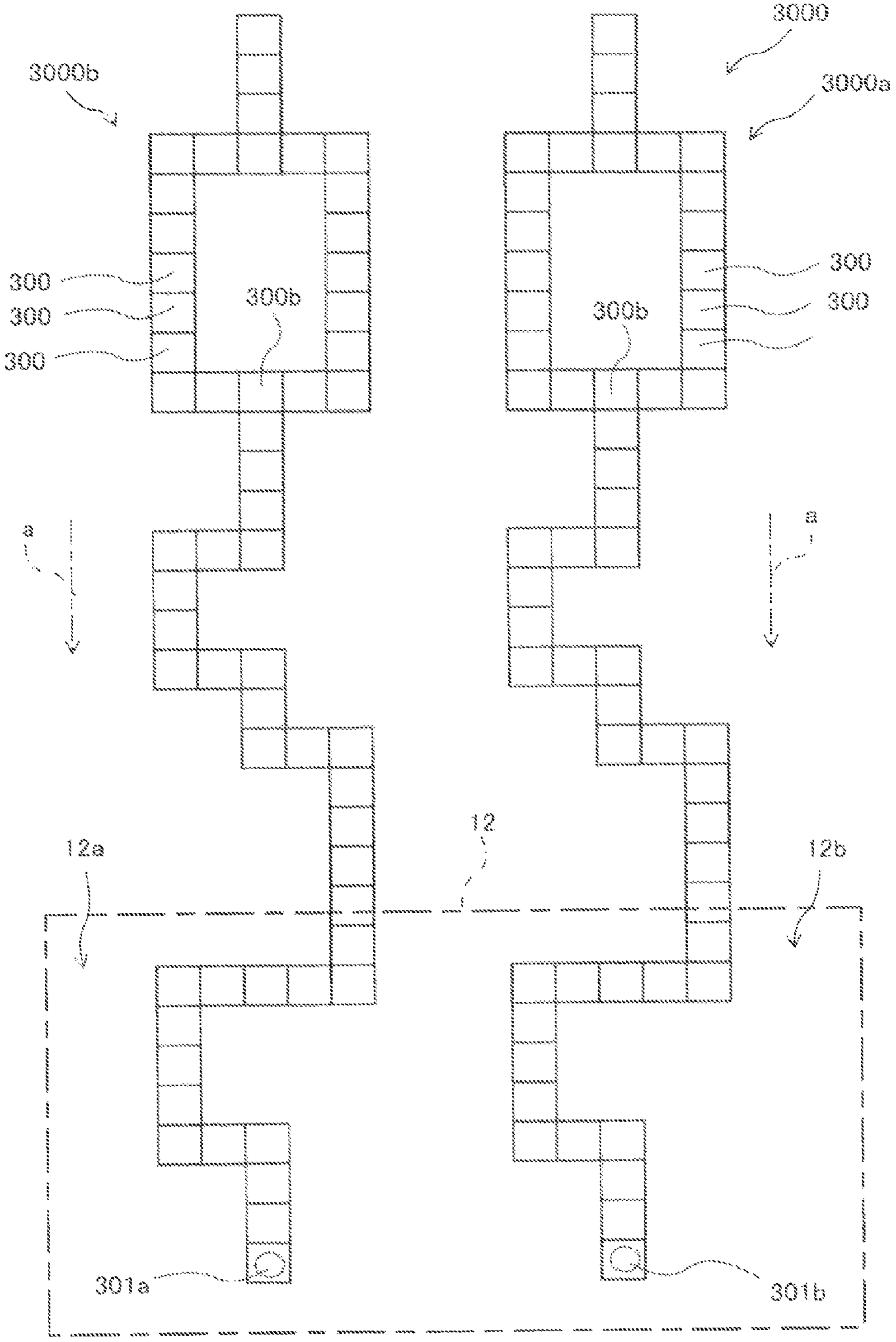
FIG. 6 is a view showing a travelling route (symbol arrays) that is displayed on a common display device.

FIG. 6 is a schematic wiring diagram showing a travelling route 3000 that is displayed in the first display region 12*a* and the second display region 12*b* of the common display device 12. FIG. 4 shows a state in which each of a travelling route for the game terminal 50*a* and a traveling route for the game terminal 50*b* is displayed.

The normal game is a game of life, for example, and in the common display device 12 that is proximal to an upper end of the respective game terminals 50*a* and 50*b*, a start position for a piece 301*a* (a piece for the game terminal 50*a*) and a piece 301*b* (a piece for the game terminal 50*b*) displayed by game characters is set, and then, from the start position, the traveling route 3000 that is formed by a plurality of frames 300 from the start position to a goal at a top part is displayed as an image. That is, the travelling route 3000 is comprised of arrays of symbols in which the plurality of frames 300 are employed as symbols. FIG. 4 is a view showing an entirety of the travelling route 3000. That is, an image of the travelling route 3000, as shown in FIG. 4, is stored in the ROM 23 (FIG. 6) incorporated in the control portion 30 of the gaming machine 10. Such an image is adapted to scroll-displayed in the direction indicated by the arrow a, in accordance with the positions of the pieces 301*a* and 301*b* on the travelling route 3000.

As shown in FIG. 6, the travelling route 3000 is made of two individual travelling routes 3000*a* and 3000*b* in which the frames 300 are formed so as to be transversely symmetrical to each other. This travelling route serves as a travelling route in which the pieces 301*a* and 301*b* corresponding to the respective game terminals 50*a* and 50*b* advance. The individual travelling routes 3000*a* and 3000*b* are individually scrolled in accordance with operation of the game terminals 50*a* and 50*b*. Specifically, the "ROLL 50 CREDITS" button (ROLL button) 61 (FIG. 3) of the game terminal 50*a* is operated, whereby the individual travelling route 3000*a* is scrolled in the direction indicated by the arrow a, and the "ROLL 50 CREDITS" button (ROLL button) 61 (FIG. 3) of the game terminal 50*b* is operated, whereby the individual traveling route 3000*b* is scrolled in the direction indicated by the arrow a. The individual travelling routes 3000*a* and 3000*b* may be scrolled at the same time, after the operation result of each of the game terminals 50*a* and 50*b* has been obtained.

Types of the frames 300 forming the traveling route 3000 include: a processing portion configured for the pieces 301*a* and 301*b* advance and stop in accordance with the rolled dice numbers in each normal game; a branch portion 300*b*; and a scramble game trigger portion (a BLANK frame). The processing portion is set so as to execute a variety of operations or processes. While the illustrative embodiment describes a case in which a fixed prize payment portion is provided as the processing portion, a processing portion executing a variety of other processes can also be applied. The branch portion is a portion at which a travelling route is branched into a plurality of sections, and for example, a branch direction is determined in accordance with the dice numbers or input from a player. The scramble game trigger portion is a frame in which a scramble game lottery is executed in a case where a piece 301 of either one of the game terminals 50*a* and 50*b* (hereinafter, the piece 301*a* or the piece 301*b* is solely referred to a piece 301) has stopped. In the scramble game lottery, a scramble game is executed if a lottery result indicating execution of the scramble game is obtained.

In a case where the piece 301 has stopped at the fixed prize payment portion, a fixed prize is adapted to be awarded to a game terminal 50*a* (50*b*) corresponding to the piece 301 that has stopped at the frame 300. In a case where the piece 301 corresponding to the two game terminals 50*a* and 50*b* has entered a predetermined stopped mode, such a special prize may be awarded. For example, a fixed prize payment may be awarded in a case where two frames 300 have stopped at fixed prize payment portions that are disposed to be transversely symmetrical to each other.

The fixed prize payment portion may have fixed prizes that are different from each other depending on the respective frames 300. There may be distributed a fixed prize payment portion with its higher prize payment as the piece 301 goes in a travelling direction. If the piece 301 stops at the branch portion 300*b*, an image prompting a player to make a selection is displayed on each of the terminal display portions 52*a* and 53*a*, and then, the subsequent travelling route is determined by an input operation of the player.

In a case where the piece 301 of either one of the game terminal 50*a* and 50*b* has stopped at the scramble game trigger portion (the BRANK frame), a scramble game lottery is executed. In the scramble game lottery, a scramble game is executed if a lottery result indicating execution of the scramble game is obtained.

In the scramble game, the piece 301 of the game terminal 50*a* or 50*b* stops, whereby an image for selecting participation in the game is displayed on a respective one of the terminal display devices 52*a* and 52*b* of the game terminals 50*a* and 50*b*, and whether or not to participate therein is determined by means of a selecting operation of a player. In order to participate in this scramble game, there is a need to play a predetermine amount of participation cost. In the scramble game, the paid amount of participation cost will be awarded to a winner of the scramble game. Each of the players makes a participating operation, whereby a match play type scramble game by each of the players is executed. Alternatively, only either one of the players makes a participating operation, whereby a match play type scramble game is executed between a player and a game terminal that participate in the game.

Figure 7:
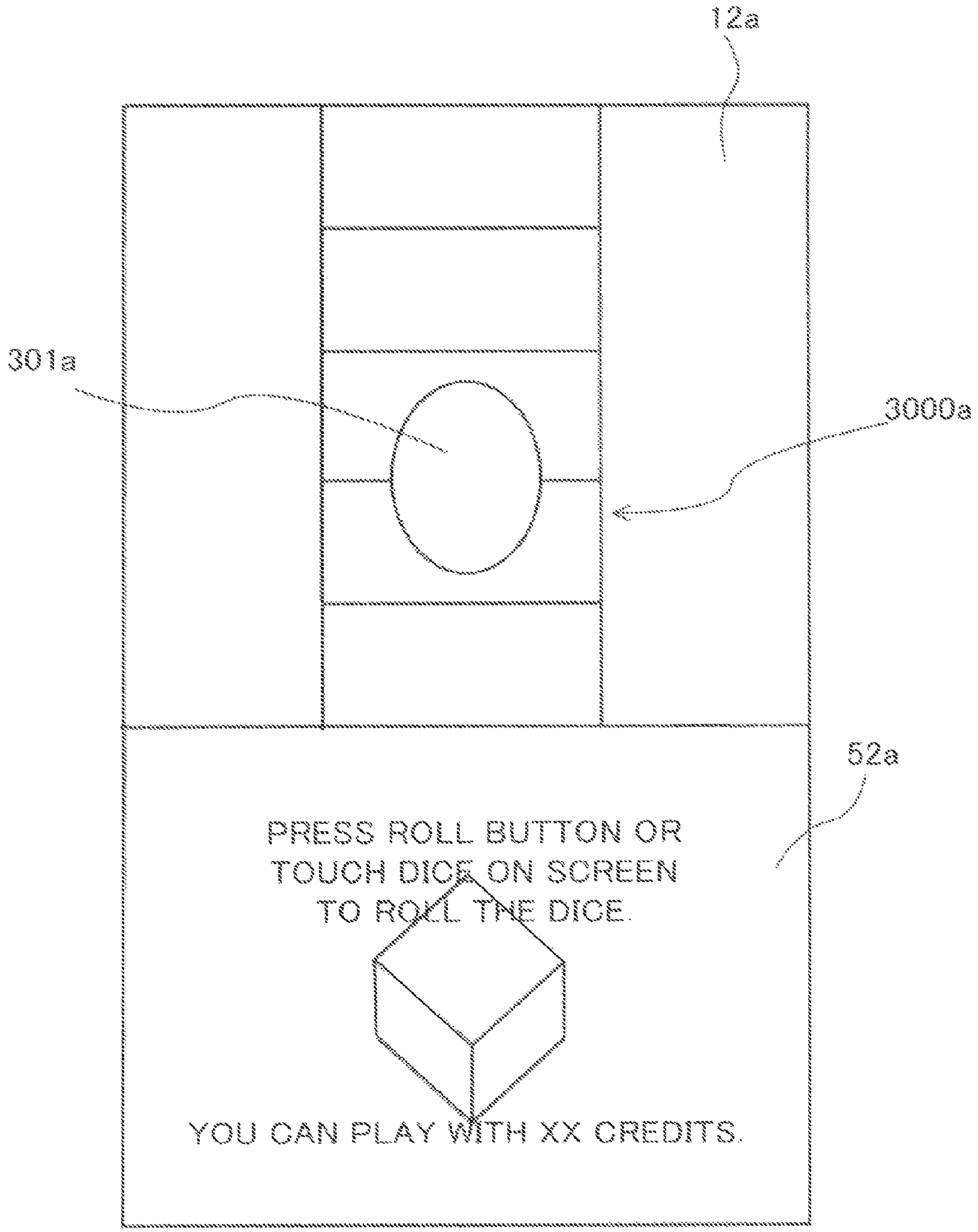
FIG. 7 is a view showing a display state of the common display device and a terminal display device.
Figure 8:
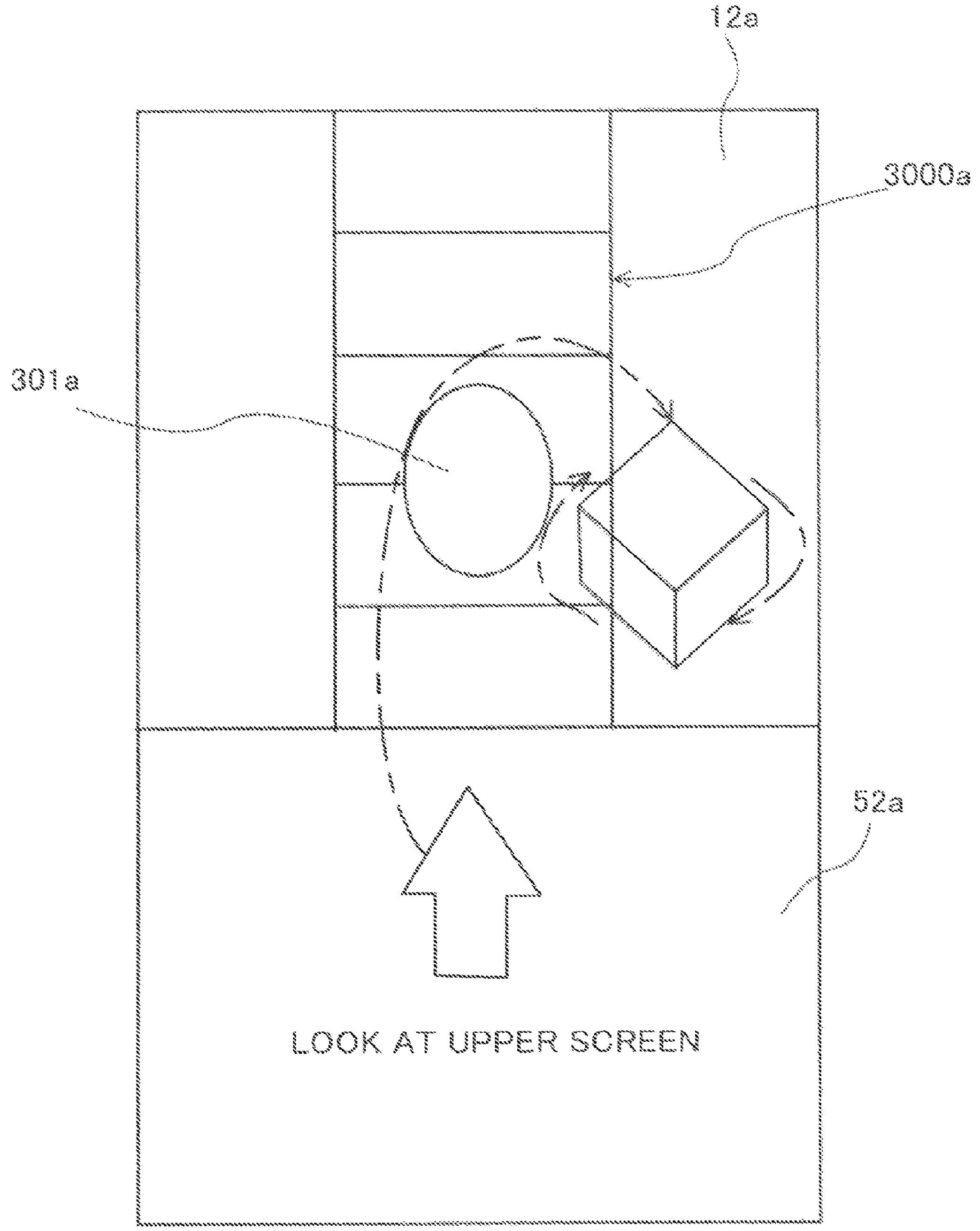
FIG. 8 is a view showing a display state of the common display device and the terminal display device.
Figure 9:
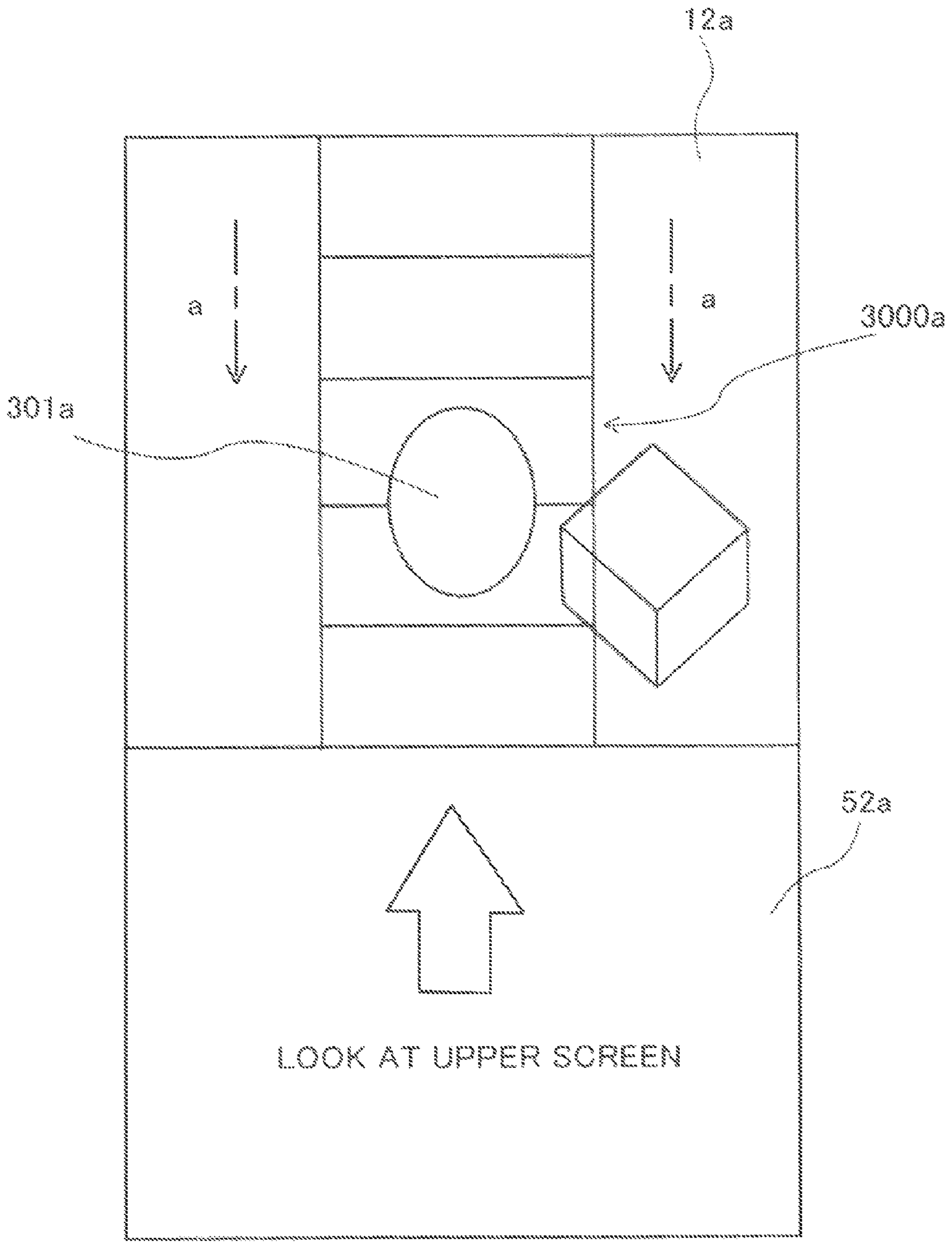
FIG. 9 is a view showing a display state of the common display device and the terminal display device.

FIG. 7 to FIG. 9 are schematic wiring diagrams showing display images of the terminal display device 52*a* (52*b*) and the common display device 12 (the first display region 12*a* (the second display region 12*b*) in a case where the number of frames that the pieces advance is determined. While the following description will is given with respect to a game terminal 50*a* of the two game terminals 50*a* and 50*b*, it is assumed that similar image display or processing is executed in the game terminal 50*b*.

As shown in FIG. 7, the terminal display device 52*a* of the game terminal 50*a* displays a message "PRESS ROLL BUTTON OR TOUCH DICE ON SCREEN TO ROLL THE DICE. YOU CAN PLAY WITH XX CREDITS". In this case, the individual travelling route 3000*a* and the piece 301*a* corresponding to the game terminal 50*a* are displayed in the first display region 12*a* of the common display device 12.

When a player makes pressing operation of the "ROLL 50 CREDITS" button (ROLL button) 61 (FIG. 3) at the operating portion 53*a* (FIG. 3) or touches a dice image on the terminal display device 52*a*, a CPU 71 of the game terminal 50*a* subtracts the predetermined credits required to play a game from the number of credits that is input from a credit input device 66 (FIG. 5) of the game terminal 50*a*, based on an operation result of the ROLL button 61 or an operation result of the touch panel 60. In a case where subtraction has been possible, the fact designates that the number of credits that is capable of executing a game in the game terminal 50*a* has been input, and the CPU 71 enables the progress of the game and displays a dice rolling image as a motion image, as shown in FIG. 8, in such a way that the imaged dice roll from the terminal display device 52*a* to the common display device 12 (the first display region 12*a*). Then, the CPU 71, as shown in FIG. 9, causes the first display region 12*a* of the common display device 12 to subsequently display an image indicating that the rolled dice stop at any rolled number. The rolled numbers of the dice that stop are determined by means of a random number lottery.

The individual travelling route 3000*a* is scrolled by a distance corresponding to the rolled numbers of the dice that have stopped, whereby the piece 301*a* advances by the rolled numbers of the dice.

A game to be played in such a way that the piece 301 is caused to advance by the rolled numbers of the dice is executed in each of the game terminals 50*a* and 50*b*.

Figure 10:
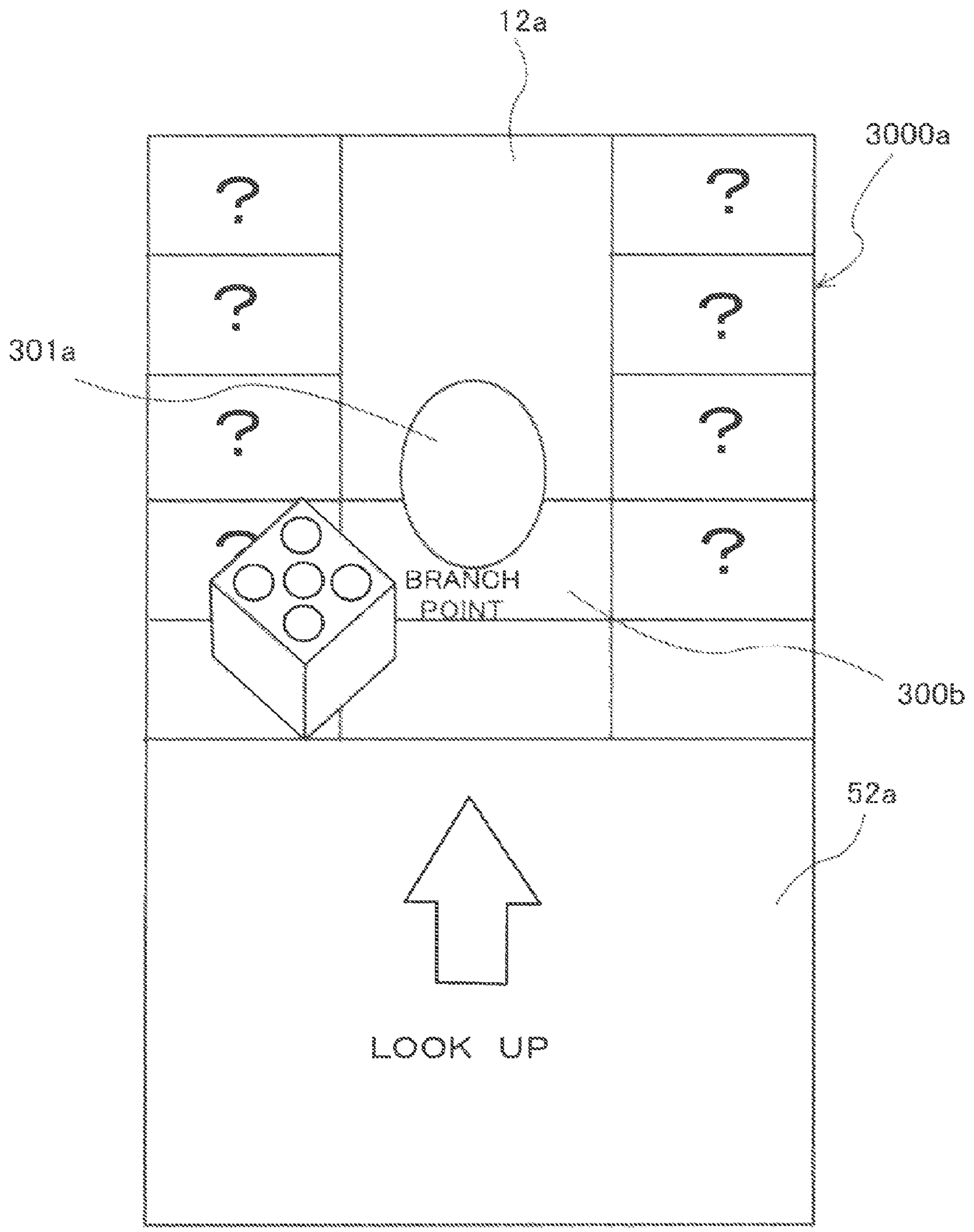
FIG. 10 is a view showing a display state of the common display device and the terminal display device.

Next, processing in a case where the piece 301 has stopped at the branch point 300*b* (FIG. 6) will be described. As shown in FIG. 10, first, characters "LOOK UP" and an upward arrow are displayed on the terminal display device 52*a*, whereby a player's view is oriented to the common display device 12. On an image of the branch point 300*b* and an image of the piece 301 having stopped at the branch point 300*b* are displayed on the first display region 12*a* of the common display device 12. Ahead from the branch point 300*b*, a "?" mark is displayed in place of a prize. At this time point, the number of events or its prize in two travelling route that are ahead from the branch point 300*b* are caused to be unidentifiable by a player.

Figure 11:
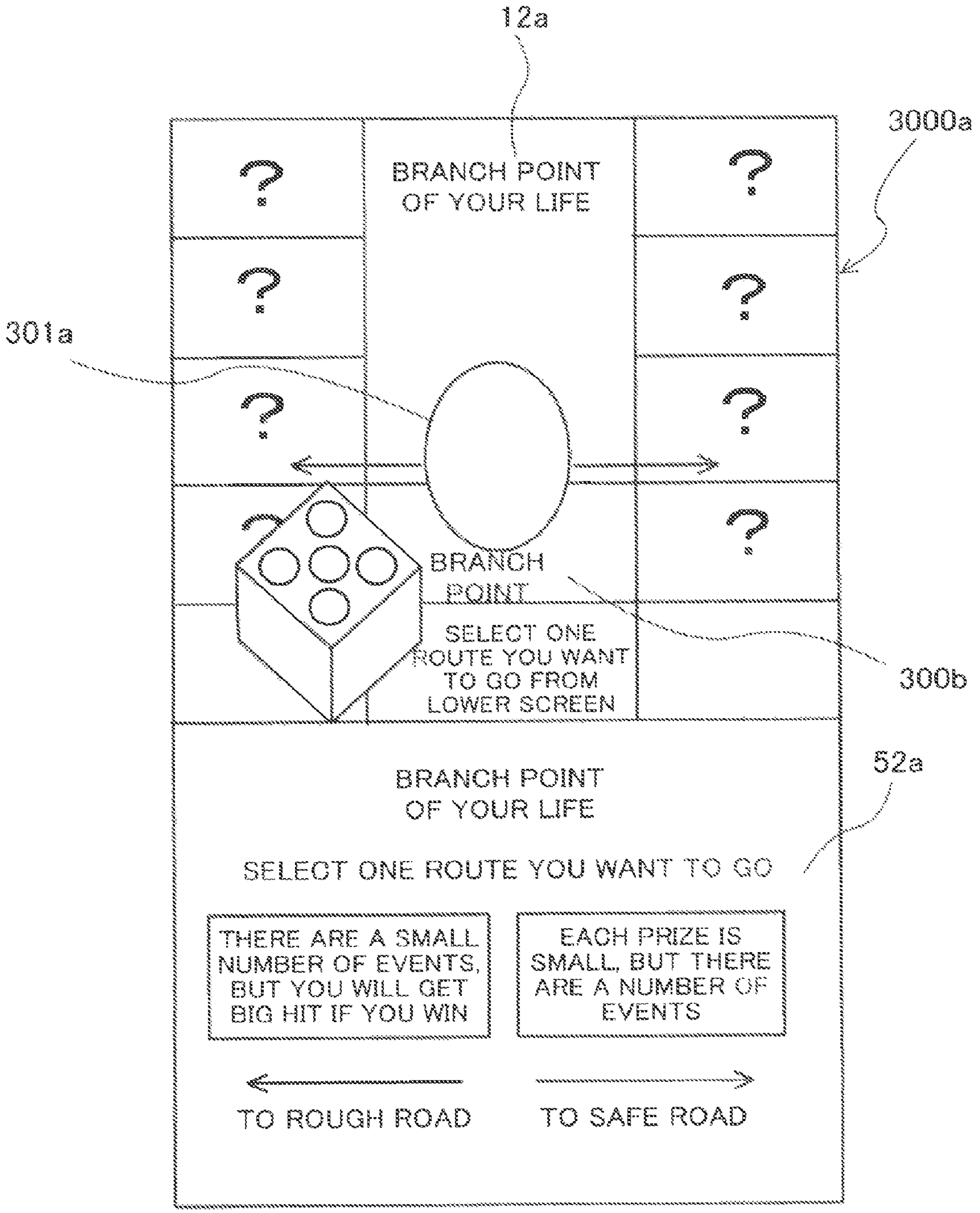
FIG. 11 is a view showing a display state of the common display device and the terminal display device.

Subsequently, as shown in FIG. 11, characters "BRANCH POINT (TURNING POINT) OF YOUR LIFE" and characters "SELECT ONE ROUTE YOU WANT TO GO FROM LOWER SCREEN" are displayed in the first display region 12*a* of the common display device 12. By display of these characters, a player pays attention to the lower screen of the terminal display device 52*a*. The terminal display device 52*a* displays the characters "BRANCH POINT OF YOUR LIFE", the characters "SELECT ONE ROUTE YOU WANT TO GO", a leftward arrow, and a rightward arrow. On the leftward arrow, characters "THERE ARE A SMALL NUMBER OF EVENTS, BUT YOU WILL GET BIG HIT IF YOU WIN" are displayed, and on the rightward arrow, characters "EACH PRIZE IS SMALL, BUT THERE ARE A NUMBER OF EVENTS" are displayed.

Figure 12:
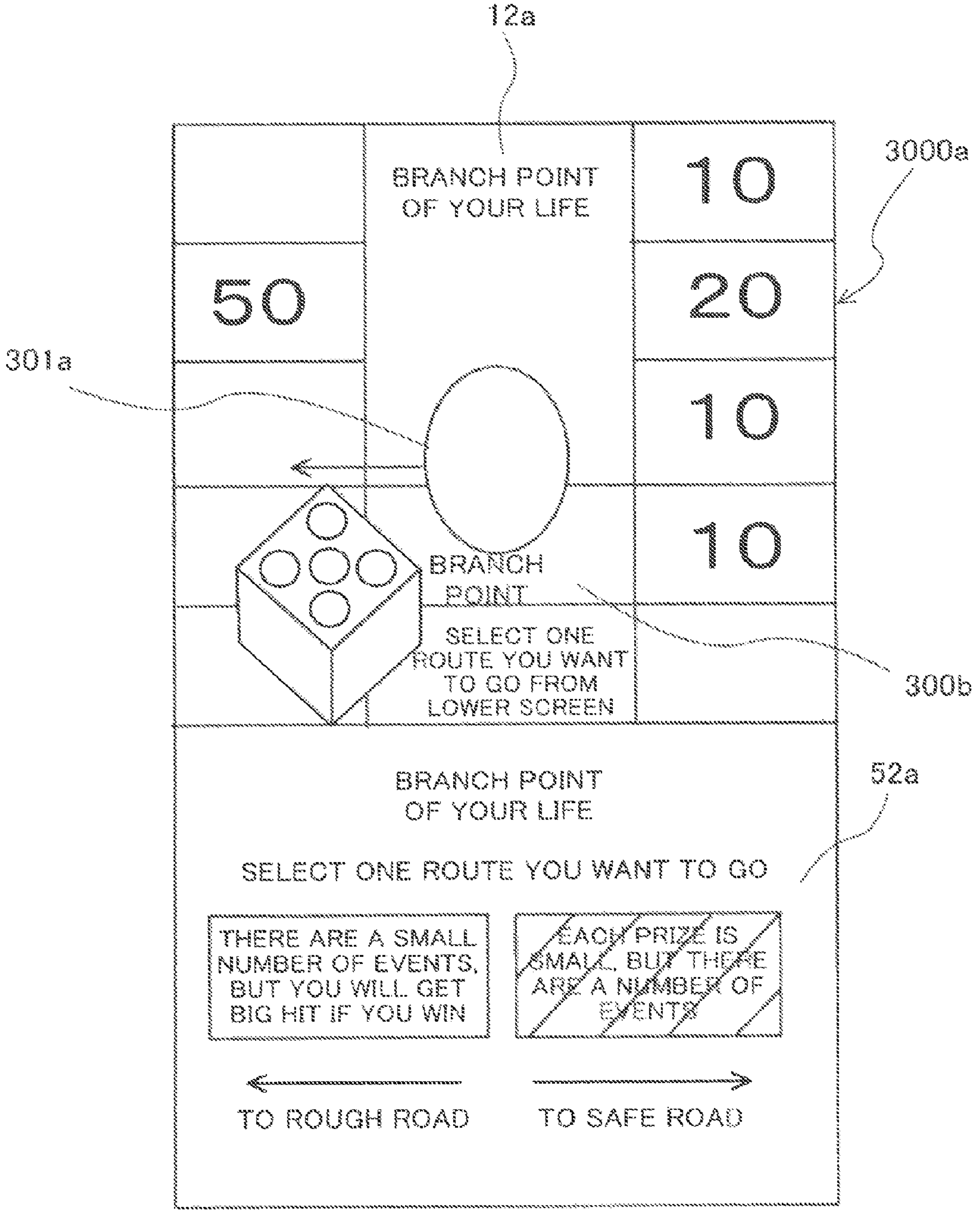
FIG. 12 is a view showing a display state of the common display device and the terminal display device.

The player selects left or right by operating the touch panel, based on these items of information. When this selection is made, the CPU 71 displays an arrow indicating a direction that is selected in the first display region 12*a* of the common display device 12 (for example, the leftward arrow) and a prize of an event in each of the travelling routes ahead from the branch point 300*b*, as shown in FIG. 12, based on a result of the selection. In this manner, the player can recognize the number of events in each of the left and right travelling routes ahead from the branch point 300*b*.

In the illustrative embodiment, in the two travelling routes ahead from the branch point 300*b*, a different number of events and the prize of each event are set in the ROM 73 of the control portion 83, and expectation values in each of the travelling routes ahead from the branch point 300*b* (a total amount of prizes relative to the entered number of credits) are identical to each other. Specifically, in a case where the left travelling route has been selected there is one event and a total of "50" prizes can be obtained in a case where the player has won as a result of a game in the event. Alternatively, in a case where the right travelling route has been selected, there are four events and a total of "50" prizes in each event can be obtained. In this manner, although there are different numbers of events, the expectation values are all the same.

Next, a scramble game will be described. If the piece 301 stops at the scramble game trigger portion (the BLANK frame), the CPU 71 determines by means of a lottery whether or not to execute a scramble event or which of a plurality of scramble events provided is to be executed if the scramble event is executed.

Figure 13:
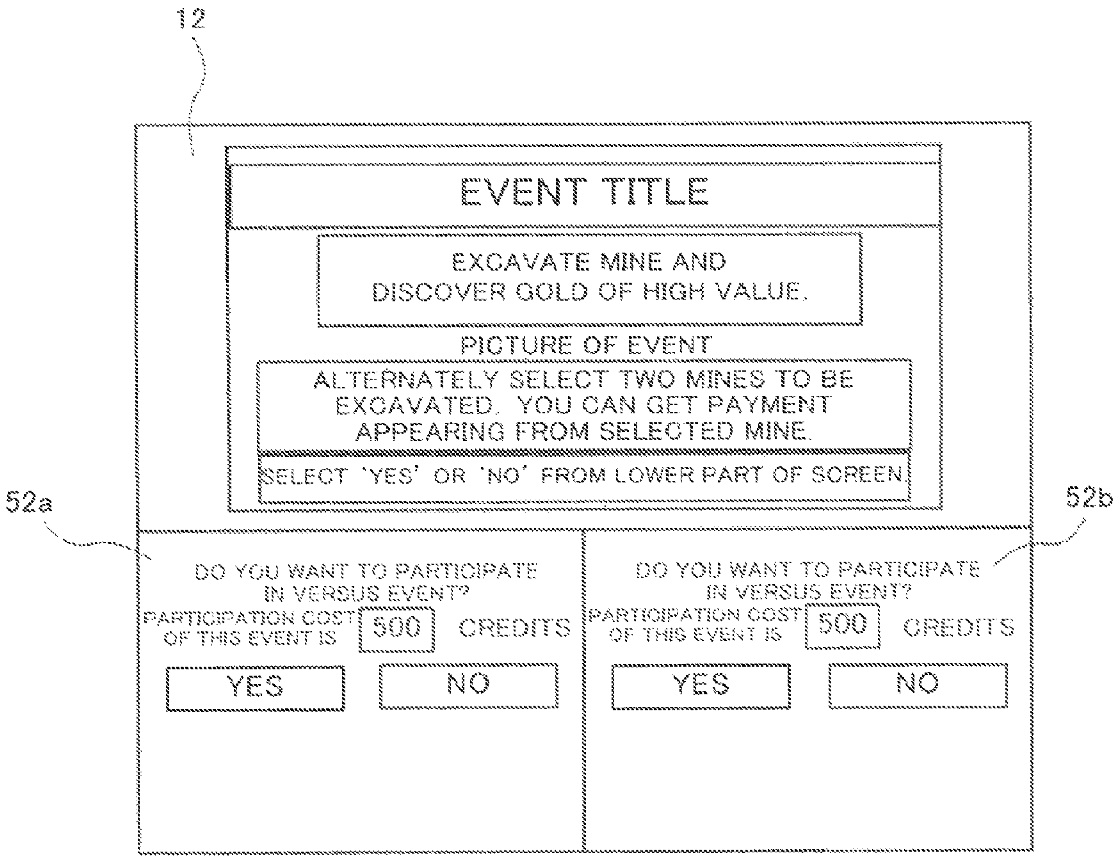
FIG. 13 is a view showing a display state of the common display device and the terminal display device.

As a result of the lottery, in a case where the scramble event is executed, as shown in FIG. 13, the common display device 12 displays a title of the event determined to be executed by means of the lottery, a picture of the event, a game playing method or the like. In addition, the respective terminal display devices 52*a* and 52*b* of the game terminals 50*a* and 50*b* display the amount of the respective participation costs, or display a display (YES or NO) for a player to select whether or not to participate in the game. When the player touches a display YES or NO, the CPU 71 carries out processing, based on a signal from the touch panel 60. In a case where the display YES has been touched, the CPU 71 subtracts the participation cost from the number of credits that has been input to the game terminal 50*a* (50*b*) and then executes the game. In a case where the display NO has been touched, the routine migrates to a game to be played by rolling the dice shown in FIG. 7 to FIG. 9 without executing the scramble event.

Figure 14:
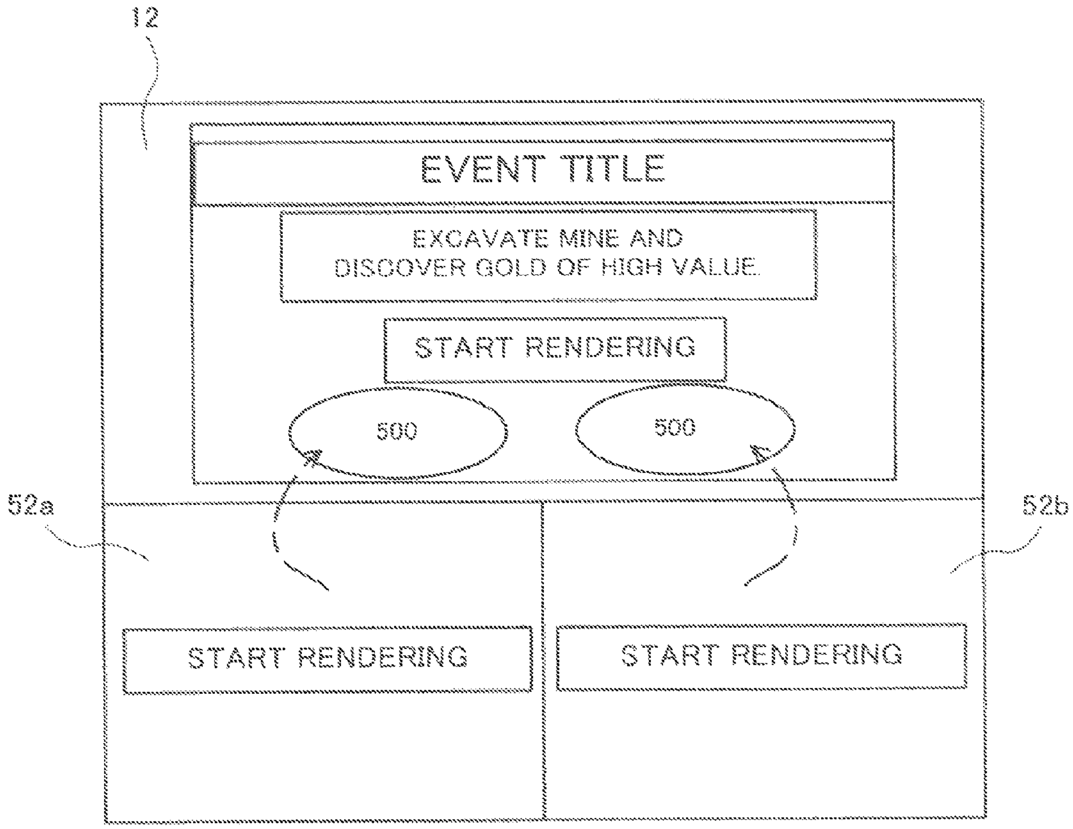
FIG. 14 is a view showing a display state of the common display device and the terminal display device.

Here, in a case where each of the game terminals 50*a* and 50*b* selects YES and then executes the scramble event, as shown in FIG. 14, a rendering image of the scramble event is displayed in each of the first display region 12*a* and the second display region 12*b* of the common display device 12 and then a start rendering image is also displayed in each of the respective display devices 52*a* and 52*b* of the game terminals 50*a* and 50*b*. Subsequently to this display, an image according to the progress of the scramble event is then displayed in a respective one of the first display region 12*a* and the second display region 12*b* of the common display device 12 and then an image according to the progress of the scramble event or an image for input operation is displayed on a respective one of the respective terminal display devices 52*a* and 52*b* of the game terminals 50*a* and 50*b*. The player touches the display for input operation of each of the terminal display devices 52*a* and 52*b*, whereby a result of the operation is output to the CPU 71 via the touch panel 60, and the scramble event is advanced by means of the CPU 71 in accordance with the result of the operation. The participation costs (input credits) of two players (players of the game terminals 50*a* and 50*b*) for the scramble event are stored in the RAM 22, and a total amount of the participation costs is paid to a winner of the scramble event.

Figure 15:
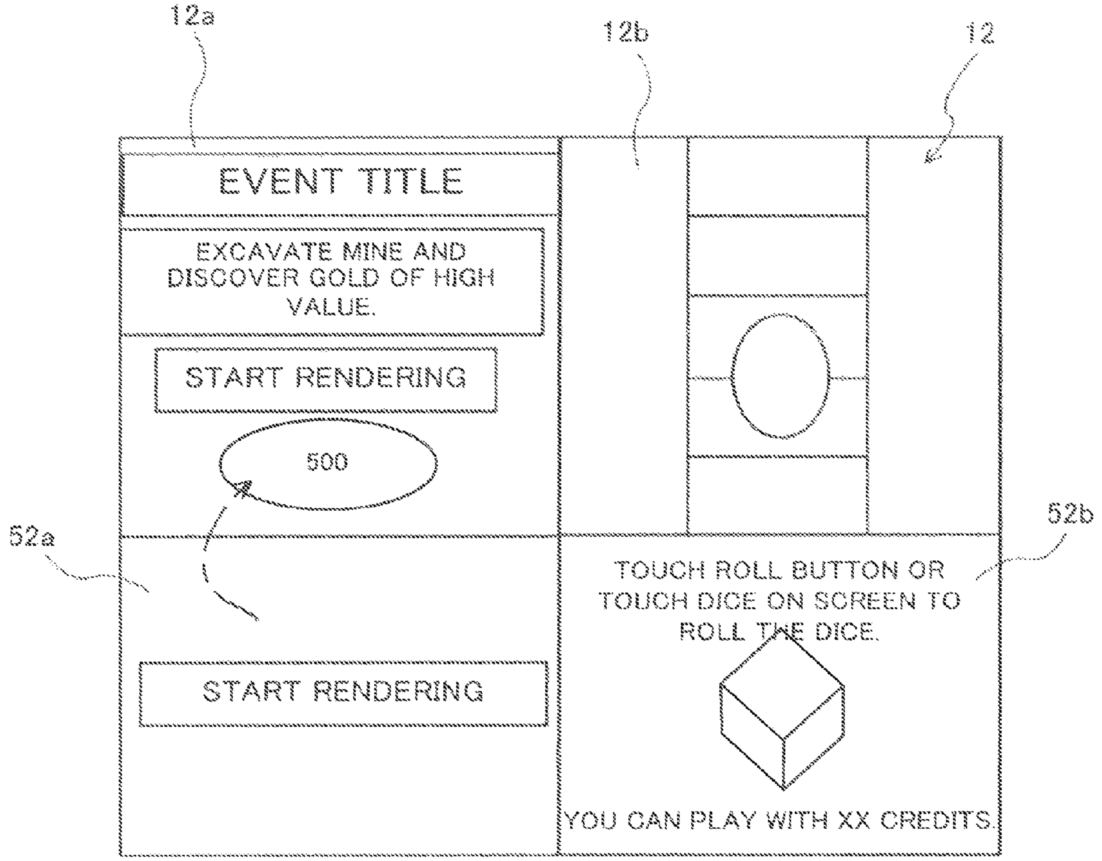
FIG. 15 is a view showing a display state of the common display device and the terminal display device.

In contrast, in a case where only one player has input participation in the scramble event, as shown in FIG. 15, an image of the scramble event is displayed in only regions (the first display region 12*a* of the common display device 12 and the terminal display device 52*a*) that correspond to a game terminal at which a participating operation has been made (for example, the game terminal 50*a*). In this case, the scramble event is executed between the game terminal 50*a* and the gaming machine 10 (the CPU 21). That is, the player who operates the game terminal 50 participates in a match play type scramble event with the gaming machine 10. In this case, a total amount of the participation costs that have been paid by the players and a preset predetermined amount are awarded to a player having won the game as a winning prize.

Next, game control processing to be executed in the gaming machine 10 will be described.

Figure 16:
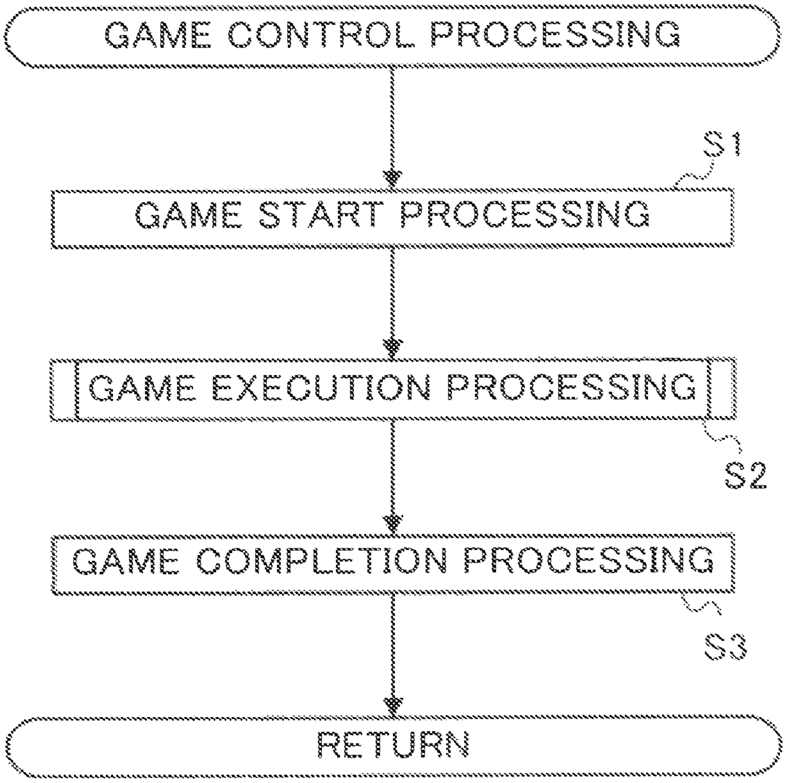
FIG. 16 is a view showing a flowchart of game control processing.

FIG. 16 is a flowchart showing game control processing procedures to be executed by means of the CPU 21 of the gaming machine 10. This processing is directed to processing to be realized by the CPU 21 executing a program that is stored in the ROM 23 of the gaming machine 10.

First, the CPU 21 executes game start processing (step S1). In this processing, the CPU 21 starts a game on a condition that a credit is input in a case where an operation of the touch panel 60 or operating portions 53*a* and 53*b* has been input from either one of the game terminals 50*a* and 50*b*.

When the game is started, the CPU 21 executes game execution processing (step S2). This processing will be described later in FIG. 17. After the game execution processing (step S2) has completed, the CPU 21 executes game completion processing (step S3). In this processing, for example, in a case where a game completes and then a win or loss has been determined, the CPU 21 awards the prize in the game to the game terminal 50*a* or 50*b* and then completes the game.

Figure 17:
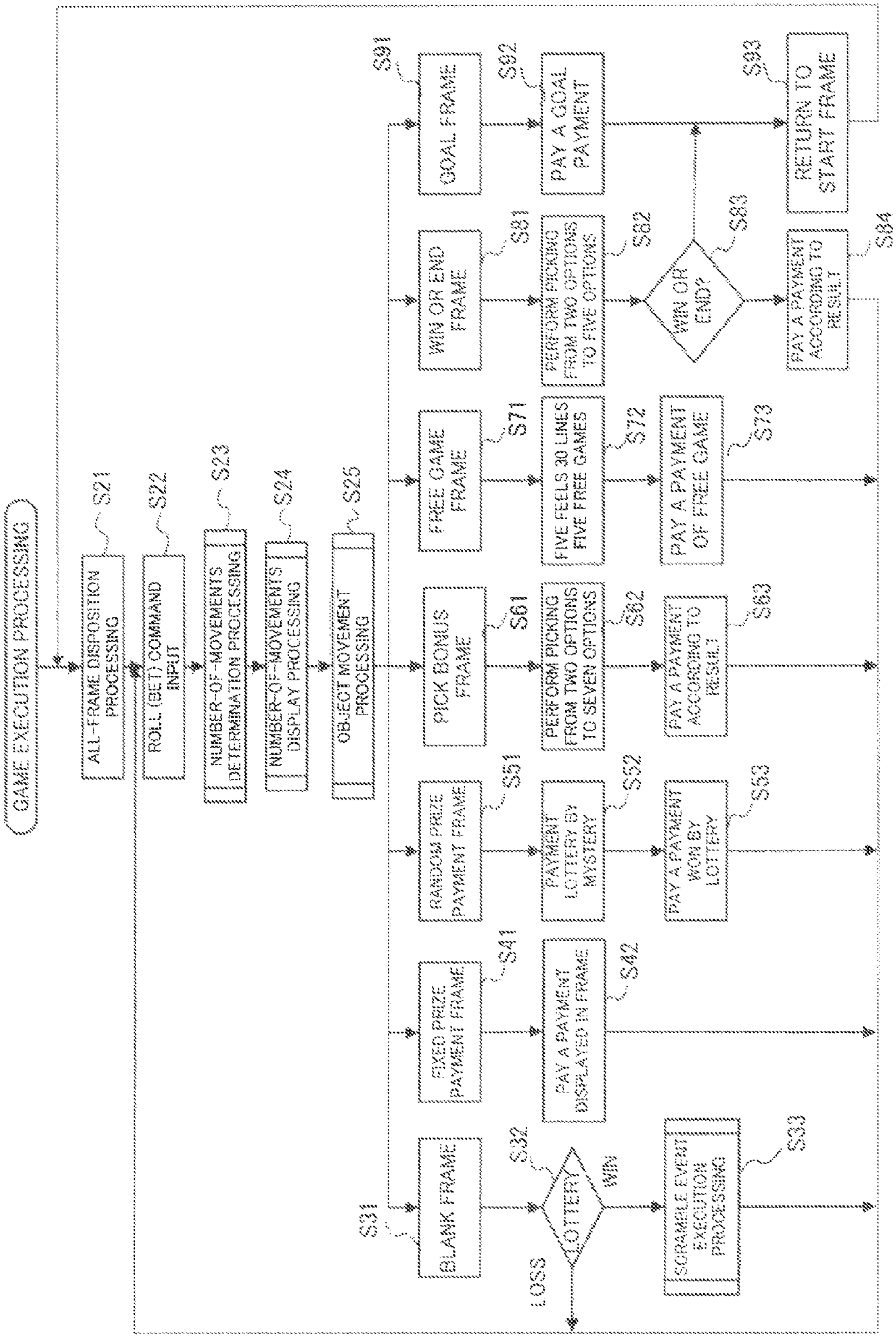
FIG. 17 is a view showing a flowchart of game execution processing.

FIG. 17 is a flowchart showing the game execution processing (step S2) in detail. In FIG. 17, the CPU 21 first executes all-frame disposition processing (step S21). In this processing, the CPU 21 selects one travelling route 3000, by means of a lottery, from among a plurality of travelling routes 3000 that are stored in the ROM 23 in advance, and then, displays the selected route on the common display device 12. In the case of the illustrative embodiment, five patterns of travelling routes 3000 are stored in the ROM 23, and one pattern is selected from these patterns.

In addition, in this processing, with respect to each of the frames 300 in the determined travelling route 3000 (for example, assuming that 200 frames 300 are set in each of the travelling routes 3000), any one of events of 223 different patterns is adapted to be selected by means of a lottery. That is, any one of 223 different types of events is selected as to each of the 200 frames. A character appearing as the piece 301 is then selected from among four different types of characters. Assuming that the number of events is different depending on the types of the characters, one of 892 different types of events is selected for each frame. In this manner, one of the 892 different types of events is selected for each of the 200 frames, and a total number of combinations in this game is obtained as 971, 112, 519, 139, 508, 000, 000. One combination is selected from among such an extremely large number of combinations; and therefore, a different kind of game (a game of life) is executed every time, and according to such a variety of the contents of games, a player's interest can be maintained every time.

In FIG. 17, after all-frame disposition processing (step S21) has completed, the CPU 21 waits for ROLL (BET) command input (step S22). In this processing, when a player operates the touch panel or operates the ROLL button 61 of the operating portions 53*a* and 53*b*, the CPU 21 executes number-of-movements determination processing (step S23).

Figure 18:
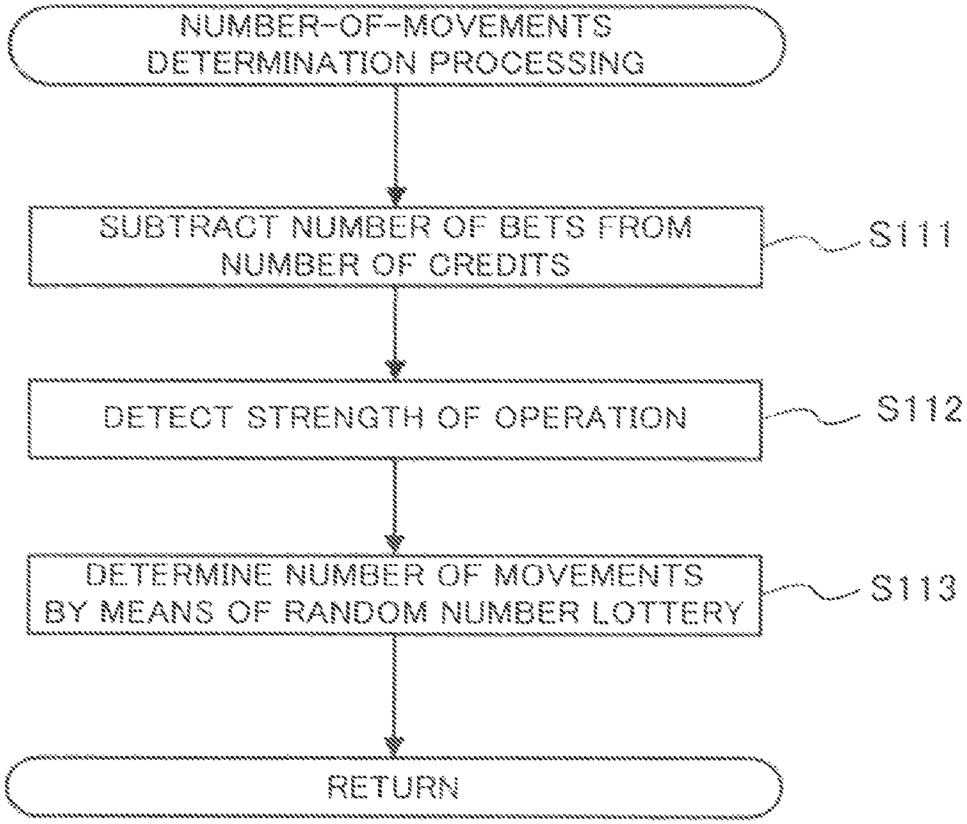
FIG. 18 is a view showing a flowchart of number-of-movements determination processing.

FIG. 18 is a flowchart showing operating procedures for the number-of-movements determination processing (step S23). In FIG. 18, the CPU 21 first subtracts the number of bets from the number of credits (step S111). Specifically, the CPU 21 subtracts the number of bets required for a game executed at this time (for example, 50 credits) from the number of credits having input from the credit input device 66 (FIG. 5) by a player (or the number of credits that is input in advance and stored in the RAM 22). In a case where this subtraction processing has been possible, the CPU 21 enables game execution. That is, the CPU 21 causes the routine to migrate to processing of detecting a strength of an operation (step S112).

Specifically, the CPU 21 detects a strength of a pressing operation of the touch panel 60 or the ROLL button 66. Next, the CPU 21 detects a strength of the pressing in a case where the pressing operation of the touch panel 60 or the ROLL button 66 has been made, and then, stores the detected strength in the RAM 22. The CPU 21 then determines the number of movements of the piece 301 by means of a random number lottery (step S113). In the case of the illustrative embodiment, any one of the rolled and stopped number of dice is adapted to be determined; and therefore, any one of the numbers 1 to 6 is determined.

After the number-of-movements determination processing shown in FIG. 18 has completed, the CPU 21 causes the routine to migrate to the number-of-movements display processing shown in FIG. 17 (step S24). In the number-of-movements display processing (step S24), the CPU 21 first reads out from the RAM 22 the strength of the operation that is detected in step S112 described above, and then, selects a display mode of dice according to the detected strength (a dice rolling distance and a rolling time) from among the distances and times that are stored in advance in the ROM 23.

The CPU 21 then displays a dice image in a rolling mode on the terminal display devices 52*a* and 52*b* of the game terminals 50*a* and 50*b* (step S132). Further, the CPU 21 displays the dice image in a rolling mode so as to be moved from the terminal display devices 52*a* and 52*b* of the game terminals 50*a* and 50*b* to the common display device 12 (step S133).

Afterwards, the CPU 21 displays a dice image on the common display device 12 in a rolling-stop mode (step S134). In this manner, the number of faces displayed as an image in the dice that have stopped is equal to the number determined by dice rolling. This number is controlled to be displayed so as to be equal to the number of movements of the piece 301 that is determined in step S113 indicating the number-of-movements determination processing (FIG. 18).

Figure 19:
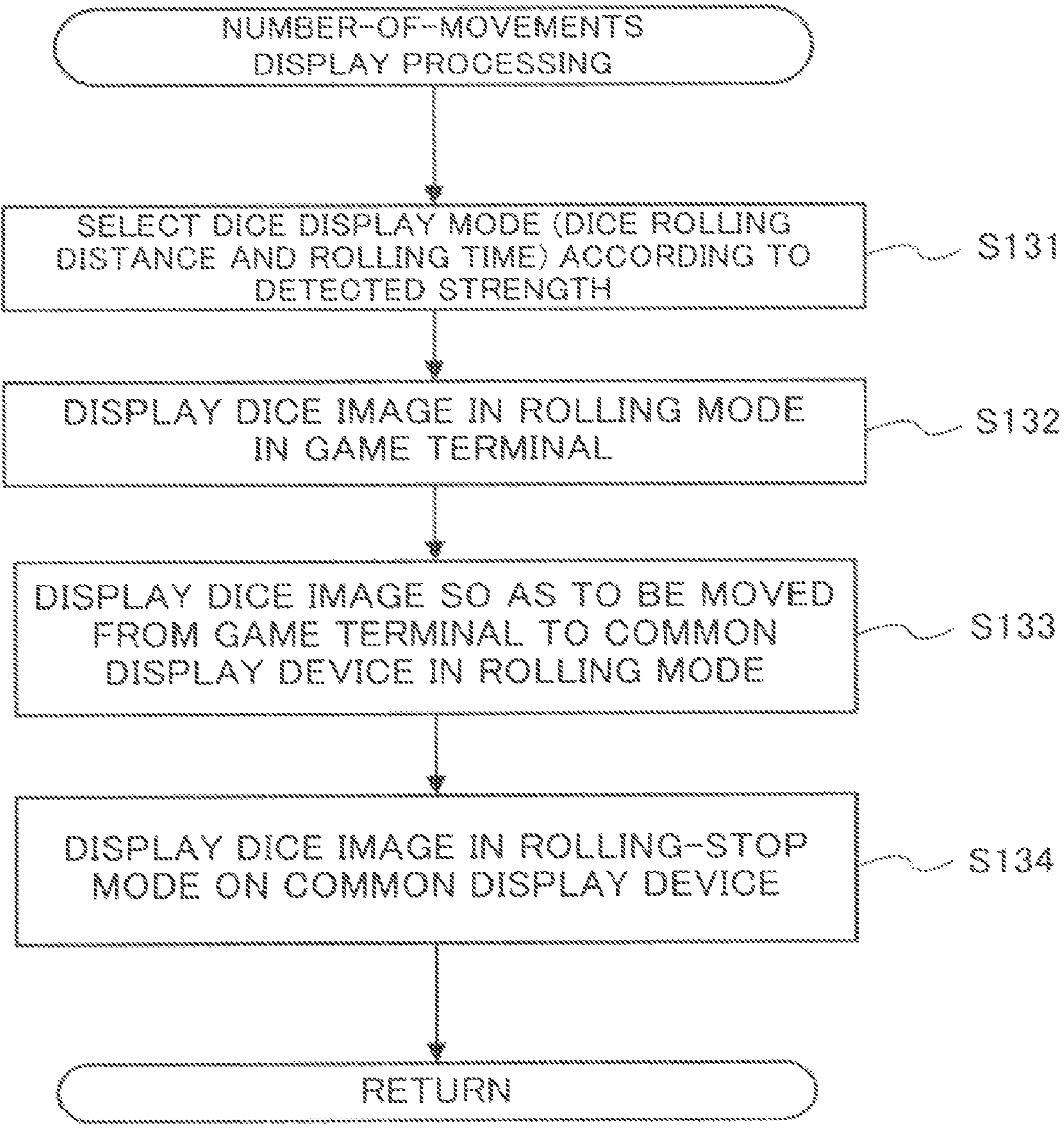
FIG. 19 is a view showing a flowchart of the number-of-movements determination processing.

After the number-of-movements display processing shown in FIG. 19 has completed, the CPU 21 executes object movement processing shown in FIG. 17 (step S25). In this processing, the CPU 21 scrolls the travelling route 3000 on the common display device 12 by the number of movements of the piece 301 that is determined in step S113 indicating the number-of-movements determination processing (FIG. 18).

Figure 20:
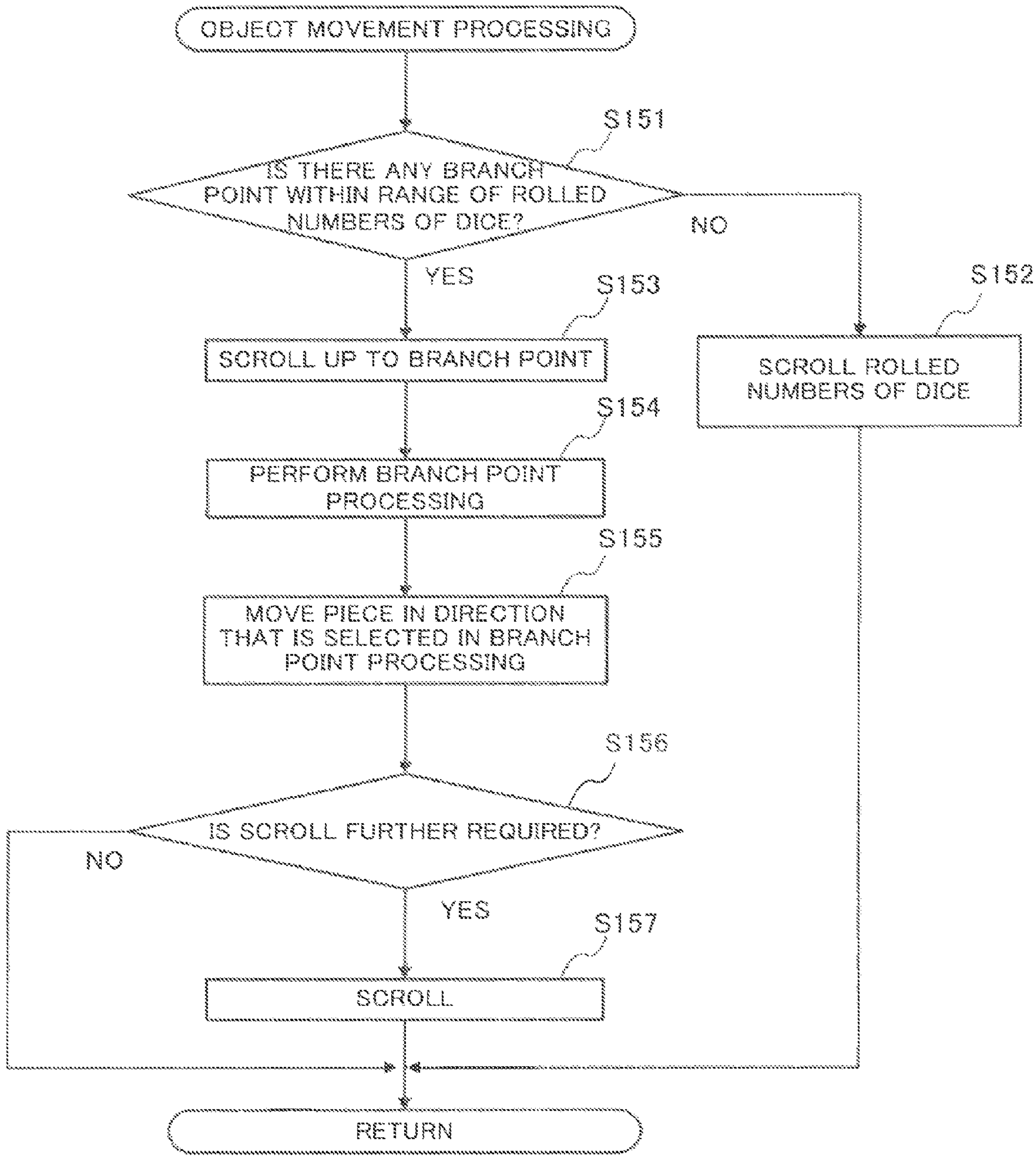
FIG. 20 is a view showing a flowchart of object movement processing.

Specifically, the CPU 21 executes the object movement processing shown in FIG. 20. In FIG. 20, the CPU 21 first determines whether or not there is the branch point 300*b* within the range of the rolled numbers of dice from a position of the frame at which the piece 301 stops at this time (step S151). In a case where there is no branch point 300*b*, the CPU 21 scrolls the travelling route 3000 (3000*a* or 3000*b*) by the rolled numbers of dice (step S152) by obtaining a negative result in the step S151 and then causes the routine to revert to the game execution processing shown in FIG. 17.

In contrast, in a case where there is a branch point 300*b* within the range of the rolled numbers of dice, the CPU 21 scrolls the travelling route 3000 (3000*a* or 3000*b*) up to the branch point 300*b* by obtaining an affirmative result in step S151. Next, the CPU 21 executes branch point processing (step S154). In the branch point processing, the CPU 21 executes the above described processing operations in FIG. 10 to FIG. 12, thereby causing a player to select a direction to be advanced from the branch point.

The CPU 21 then causes the piece 301 to move the direction that is selected in the processing of step S154. This movement distance is a distance that is equivalent to a remaining distance (the number of frames) obtained by subtracting the number of frames from a frame position at which the piece 301 stays at the time of starting the object movement processing to a branch point from the rolled numbers of dice. The rolled numbers of dice (the numbers that are determined in step S113 shown in FIG. 18) are stored in the RAM 22 when they are determined in step S113, and then, the CPU 21 reads out and employs the numbers that are stored in the RAM 22. As a specific example of a distance for advancing the piece 301, in a case where the position of a frame at which the piece 301 stays has been more three frames up to the branch point 300*b*, assuming that the rolled number of a die is 6, the piece further moves by three frames from the branch point 300*b* in the direction that is selected by a player. This movement is made in a direction that is different from the scroll direction of the travelling route 3000*a* or 3000*b* (the scroll direction is in a downward direction, whereas the movement direction ahead from the branch point 300*b* is in a horizontal direction).

Next, the CPU 21 determines whether or not scroll is further required (step S156). That is, in a case where the piece 301 has been moved from the branch point 300*b* in a direction that is different from the scroll direction (for example, in a horizontal direction in a case where a scroll direction is in a downward direction), where the direction of the frame changes in the scroll direction before the piece reaches the movement distance (the number of frames) by the rolled numbers of dice, scroll of the travelling route 3000*a* or 3000*b* is further required in addition to moving the piece 301 in the horizontal direction. Therefore, in this case, the CPU 21 scrolls the travelling route 3000*a* or 3000*b* by a further required distance (step S157) and then causes the routine to revert to the game execution processing shown in FIG. 17. On the other hand, in a case where the direction of the frame does not change in the scroll direction before the piece reaches the movement distance (the number of frames) by the rolled numbers of dice, there is no need to scroll; and therefore, the CPU 21 causes the routine to revert to the game execution processing shown in FIG. 17.

The rolled numbers of dice and the positions of the respective frames in the travelling route 3000 are stored in the RAM 22, and based on these items of stored data, the CPU 21 can compute the presence or absence of scroll or a scroll quantity and the movement quantity in the horizontal direction of the piece 301.

After the routine has reverted to the game execution processing in FIG. 17, the CPU 21 executes processing according to the position (frame) of the piece 301 that has been advanced.

In a case where the piece 301 has stopped at a BLANK frame (step S31), the CPU 21 carries out a lottery as to whether or not to execute a scrambling event (step S32). In the lottery processing, the CPU 21 carries out the lottery as to whether or not to execute the scrambling event, and in a case of an affirmative result, the CPU 21 determines a type of the scramble event to be executed, by means of the lottery.

If a result indicating that the scramble event is not executed (a loss) is obtained as a result of the lottery, the CPU 21 causes the routine to revert to step S22 described above. In contrast, a result indicating that the scramble event is executed (a win) is obtained the CPU 21 executes the scramble event of the determined type (step S33). Types of scramble events include a “discover gold from mine” event, a “strike oil” event, a “land development” event, a “resort development” event, a “purchase stock brand” event, and a “purchase jewelry” event. In a case where these events are executed, the CPU 21 displays images for the events shown in FIG. 13 to FIG. 15, on the common display device 12 and the terminal display devices 52*a* and 52*b*. After the scramble event has completed, the CPU 21 causes the routine to revert to step S22 described above.

In a case where the piece 301 has stopped at a fixed prize payment frame (step S41), the CPU 21 makes a payment for a prize that is displayed at the frame at which the piece has stopped (step S42) and then causes the routine to revert to step S22 described above. A total of 12 different types of fixed prize payment frames are provided.

In a case where the piece 301 has stopped at a random prize payment frame (step S51), the CPU 21 carries out a prize lottery by means of mystery (step S52), makes a payment for the winning prize (step S53), and then, causes the routine to revert to step S22 described above. A total of nine different types of random prize payment frames are provided.

In a case where the piece 301 has stopped at a pick bonus frame (step S61), the CPU 21 picks one option from among two options to seven options (step S62), makes a payment of a prize according to a result (step S63), and then, causes the routine to revert to step S22 described above. A total of 55 different types of pick bonus frames are provided.

In a case where the piece 301 has stopped at a Free Game frame (step S71), the CPU 21 executes five free games with five reels and 30 lines (step S72). Next, the CPU 21 makes a payment for a prize in the free games (step S73) and then causes the routine to revert to step S22 described above. One type of the Free Game frame is provided.

In a case where the piece 301 has stopped at a Win or END frame (step S81), the CPU 21 picks one option from among two options to five options (step S82) and then executes Win or END processing (step S83). This processing is directed to processing of determining whether to award a prize or revert to a start position. If an option of awarding a prize is selected as a result of the above determination, the CPU 21 makes a payment for a prize according to a result (step S84) and then causes the routine to revert to step S22 described above. In contrast, if an option of reverting to a start position is selected as the result of the determination in step S83, the CPU 21 causes the routine to revert to step S93, scrolls the travelling route 3000*a* or 3000*b* upward, causes the piece 301 to revert to the start position, and then, causes the routine to revert to step S21 described above. A total of 10 different types of Win or END frames are provided.

When the piece 301 reaches a GOAL frame (step S91), the CPU 21 makes a payment for a GOAL prize (step S92) and then scrolls the travelling route 3000*a* or 3000*b* upward in step S92, thereby causing the piece 301 to revert to the start position. Afterwards, the CPU 21 causes the routine to revert to step S21 described above. Game execution processing is carried out in accordance with the processing operations described above.

Although the embodiments of the present invention were described above, they were just illustrations of specific examples, and hence do not particularly restrict the present invention. A specific configuration of each step and the like is appropriately changeable in terms of design. Further, the effects described in the embodiments of the present invention are just recitations of the most suitable effects generated from the present invention. The effects of the present invention are thus not limited to those described in the embodiments of the present invention.

For example, while processing operations such as game control processing, game start processing, game execution processing, and game completion processing have been described as those of the CPU 21 in the gaming machine 10, these processing operations may be executed by the CPU 71 in each of the game terminals 50*a* and 50*b*.

Further, the foregoing detailed descriptions centered the characteristic parts of the present invention in order to facilitate understanding of the present invention. The present invention is not limited to the embodiments in the foregoing specific descriptions but applicable to other embodiments with a variety of application ranges. Further, terms and phrases in the present specification were used not for restricting interpretation of the present invention but for precisely describing the present invention. It is considered easy for the skilled in the art to conceive other configurations, systems, methods and the like included in the concept of the present invention from the concept of the invention described in the specification. Therefore, it should be considered that recitations of the claims include uniform configurations in a range not departing from the range of technical principles of the present invention. Moreover, an object of the abstract is to enable a patent office, a general public institution, an engineer belonging to the technical field who is unfamiliar with patent, technical jargon or legal jargon, and the like, to smoothly determine technical contents and an essence of the present application with simple investigation. Accordingly, the abstract is not intended to restrict the scope of the invention which should be evaluated by recitations of the claims. Furthermore, for thorough understanding of an object of the present invention and an effect specific to the present invention, it is desired to make interpretation in full consideration of documents already disclosed and the like.

The foregoing detailed descriptions include processing executed on a computer. Explanations and expressions above are described with the aim of being most efficiently understood by the skilled person in the art. In the specification, each step for use in deriving one result should be understood as the self-consistent processing. Further, in each step, transmission/reception, recording or the like of an electrical or magnetic signal is performed. While such a signal is expressed by using a bit, a value, a symbol, a letter, a term, a number or the like in processing of each step, it should be noted that those are used simply for the sake of convenience in description. While there are cases where processing in each step may be described using an expression in common with that of action of a human, processing described in the specification is essentially executed by a variety of devices. Further, other configurations requested for performing each step should become apparent from the above descriptions.

What is claimed is:

1. A gaming machine comprising:

a display device configured to display a part of a travelling route including arrays of a plurality of symbols that are continuously arranged, the travelling route serving as a route in which a piece corresponding to the gaming machine advances and the piece advancing in substantially upward direction along the travelling route;

an additional display device, the display device being disposed upward of the additional display device; and a controller programmed to execute the processing operations of:

(a1) executing game processing and then determining whether or not to scroll the travelling route according to a result of the game processing;

(a2) scrolling the travelling route in downward direction according to a result of the determination, a displayed part of the travelling route is changed as a result of the scroll; and (a3) carrying out processing according to the result of the scroll, wherein the controller is configured to:

movably display an image of a die that is displayed on the additional display device, so that the image of the die moves to the display device and then determine a number that is assigned to any one face of the die as a result of the game processing in the processing operation (a1); and scroll the travelling route that is displayed on the display device, according to the determined number of the die in the processing operation (a2).

2. The gaming machine according to claim 1, wherein the controller is configured to execute a scramble event in the processing operation (a3), and the scramble event is a game where participation costs that are paid from a plurality of game terminals are provided to a game terminal that corresponds to a winner of the scramble event among the plurality of game terminals.

3. A control method of a gaming machine that has a display device configured to display a part of a travelling route including arrays of a plurality of symbols that are continuously arranged, the travelling route serving as a route in which a piece corresponding to the gaming machine advances and the piece advancing in substantially upward direction along the travelling route, wherein the gaming machine further includes an additional display device, the display device being disposed upward of the additional display device, the control method comprising:

(a1) executing game processing and then determining whether or not to scroll the travelling route according to a result of the game processing;

(a2) scrolling the travelling route in downward direction according to a result of the determination, a displayed part of the travelling route is changed as a result of the scroll; and (a3) carrying out processing according to the result of the scroll, wherein the control method further comprising:

movably displaying an image of a die that is displayed on the additional display device, so that the image of the die moves to the display device and then determine a number that is assigned to any one face of the die as a result of the game processing in the processing operation (a1); and scrolling the travelling route that is displayed on the display device, according to the determined number of the die in the processing operation (a2).

4. The control method according to claim 3, further comprising:

executing a scramble event in the processing operation (a3), wherein the scramble event is a game where participation costs that are paid from a plurality of game terminals are provided to a game terminal that corresponds to a winner of the scramble event among the plurality of game terminals.

5. A gaming machine comprising:

a first display device configured to display a part of a travelling route including arrays of a plurality of symbols that are continuously arranged, the travelling route serving as a route in which a piece corresponding to the gaming machine advances;

a second display device, the first display device being disposed upward of the second display device; and a controller programmed to execute the processing operations of:

(a1) executing game processing;

(a2) moving the piece on the travelling route according to a result of the game processing;

(a3) when the moved piece stops at a branch point, displaying an image for selecting any one of branched travelling routes, the branched travelling routes including a first branched travelling route for providing a first number of events and a second branched travelling route for providing a second number of events each providing a higher prize than each event of the first branched travelling route, and the first number being greater than the second number; and (a4) determining any one of the branched travelling routes according to an input of the player, wherein the controller is configured to:

movably display an image of a die that is displayed on the second display device, so that the image of the die moves to the first display device and then determine a number that is assigned to any one face of the die as a result of the game processing in the processing operation (a1); and scroll the travelling route that is displayed on the first display device, according to the determined number of the die in the processing operation (a2).

6. A gaming machine comprising:

a plurality of gaming terminals, each including a first display device and a second display device, the first display device being configured to display a part of a travelling route including arrays of a plurality of symbols that are continuously arranged, the travelling route serving as a route in which a piece corresponding to the gaming machine advances, and the first display device being disposed upward of the second display device; and a controller programmed to execute the processing operations of:

(a1) executing game processing;

(a2) moving the piece on the travelling route according to a result of the game processing;

(a3) when the moved piece stops at a predetermined point, determining by means of a lottery whether or not to execute a scramble event;

(a4) displaying an image representing an amount of a participation cost and requiring each of players to select whether or not to participate in the scramble event when determining to execute the scramble event;

(a5) subtracting the amount of the participation cost from credits of each player and storing a total amount of the participation costs that are paid from the game terminals when a participation in the scramble event is selected an input of each player;

(a6) executing the scramble event to determine a winner of the scramble event from among the game terminals; and (a7) awarding an amount determined by the total amount of the participation costs to the winner, wherein the controller is configured to:

movably display an image of a die that is displayed on the second display device, so that the image of the die moves to the first display device and then determine a number that is assigned to any one face of the die as a result of the game processing in the processing operation (a1); and scroll the travelling route that is displayed on the first display device, according to the determined number of the die in the processing operation (a2).

* * * * *